(12) United States Patent
Jain et al.

(10) Patent No.: US 7,548,918 B2
(45) Date of Patent: Jun. 16, 2009

(54) TECHNIQUES FOR MAINTAINING CONSISTENCY FOR DIFFERENT REQUESTORS OF FILES IN A DATABASE MANAGEMENT SYSTEM

(75) Inventors: Namit Jain, San Jose, CA (US); Sam Idicula, San Jose, CA (US); Syam Pannala, Fremont, CA (US); Nipun Agarwal, Santa Clara, CA (US); Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 11/013,890

(22) Filed: Dec. 16, 2004

(65) Prior Publication Data

US 2006/0136516 A1 Jun. 22, 2006

(51) Int. Cl.
G06F 17/30 (2006.01)
(52) U.S. Cl. ............ 707/8; 707/9; 710/28; 710/29; 710/36; 710/200; 711/141; 711/147; 711/154; 715/229; 715/733; 715/751; 717/122; 717/170; 718/106
(58) Field of Classification Search ................ None
See application file for complete search history.

(56) References Cited

U.S. PATENT DOCUMENTS

| | | | |
|---|---|---|---|
| 5,388,257 A | 2/1995 | Bauer | |
| 5,768,532 A * | 6/1998 | Megerian | 709/245 |
| 5,918,229 A | 6/1999 | Davis et al. | |
| 5,937,406 A | 8/1999 | Balabine et al. | |
| 5,956,712 A | 9/1999 | Bennett et al. | |

(Continued)

FOREIGN PATENT DOCUMENTS

EP 0 398 495 A2 11/1990

(Continued)

OTHER PUBLICATIONS

N. Gehani et al, "OdeFs: A File System Interface to an Object-Oriented Database", AT & T Bell Laboratories, New Jersey, 1989.*

(Continued)

Primary Examiner—Apu M Mofiz
Assistant Examiner—Hung D Le
(74) Attorney, Agent, or Firm—Hickman Palermo Truong & Becker LLP

(57) ABSTRACT

A method and apparatus for providing file system operation locks at a database server is provided. A database server may employ database locks and file system operation locks in servicing requests from consistent requestors and inconsistent requesters. A database lock is a lock that is obtained in response to performing a database operation, and the database lock is released when the database operation has successfully completed. A file system operation lock is a lock that is obtained in response to performing an OPEN file system operation, and the file system operation lock is released when a CLOSE file system operation is performed. The database server may use a temporary copy of the resource, which reflects all the current changes that have been made to the resource by database operations, in servicing consistent requestors, and may use the original version of the resource in servicing inconsistent requesters.

34 Claims, 8 Drawing Sheets

U.S. PATENT DOCUMENTS

| | | | |
|---|---|---|---|
| 5,987,506 A | | 11/1999 | Carter et al. |
| 6,029,160 A | * | 2/2000 | Cabrera et al. ................. 707/1 |
| 6,032,216 A | | 2/2000 | Schmuck et al. |
| 6,088,694 A | * | 7/2000 | Burns et al. ..................... 707/8 |
| 6,304,873 B1 | * | 10/2001 | Klein et al. ..................... 707/8 |
| 6,321,219 B1 | | 11/2001 | Gainer et al. |
| 6,389,420 B1 | * | 5/2002 | Vahalia et al. ................. 707/8 |
| 6,393,435 B1 | * | 5/2002 | Gartner et al. ............. 707/200 |
| 6,442,548 B1 | * | 8/2002 | Balabine et al. .............. 707/10 |
| 6,453,313 B1 | * | 9/2002 | Klein et al. ..................... 707/3 |
| 6,457,007 B1 | | 9/2002 | Kikuchi et al. |
| 6,487,469 B1 | | 11/2002 | Formenti |
| 6,493,742 B1 | | 12/2002 | Holland et al. |
| 6,493,804 B1 | | 12/2002 | Soltis et al. |
| 6,496,944 B1 | | 12/2002 | Hsiao et al. |
| 6,532,488 B1 | | 3/2003 | Ciarlante et al. |
| 6,549,916 B1 | | 4/2003 | Sedlar |
| 6,564,215 B1 | * | 5/2003 | Hsiao et al. ..................... 707/8 |
| 6,587,873 B1 | | 7/2003 | Nobakht et al. |
| 6,728,709 B1 | * | 4/2004 | Plasek et al. ................... 707/8 |
| 6,732,124 B1 | | 5/2004 | Koseki et al. |
| 6,772,155 B1 | * | 8/2004 | Stegelmann ................... 707/8 |
| 6,779,001 B1 | | 8/2004 | Kanai et al. |
| 6,799,188 B2 | * | 9/2004 | Weedon ..................... 707/202 |
| 6,850,938 B1 | | 2/2005 | Sadjadi |
| 6,857,001 B2 | | 2/2005 | Hitz et al. |
| 6,877,095 B1 | | 4/2005 | Allen |
| 6,948,039 B2 | | 9/2005 | Blessener et al. |
| 6,959,313 B2 | | 10/2005 | Kapoor et al. |
| 7,076,509 B1 | * | 7/2006 | Chen et al. ................. 707/202 |
| 7,085,785 B2 | | 8/2006 | Sawdon et al. |
| 7,139,781 B2 | | 11/2006 | Young et al. |
| 7,143,120 B2 | | 11/2006 | Oks et al. |
| 7,177,866 B2 | * | 2/2007 | Holenstein et al. ............. 707/8 |
| 7,280,995 B1 | | 10/2007 | Sedlar |
| 7,313,557 B1 | | 12/2007 | Noveck |
| 7,366,740 B2 | | 4/2008 | Sleeman et al. |
| 7,437,407 B2 | * | 10/2008 | Vahalia et al. .............. 709/203 |
| 2001/0051958 A1 | | 12/2001 | DeVries et al. |
| 2002/0073056 A1 | | 6/2002 | Broster et al. |
| 2002/0128995 A1 | | 9/2002 | Muntz et al. |
| 2002/0184216 A1 | * | 12/2002 | Chandrasekaran et al. ...... 707/8 |
| 2003/0033328 A1 | | 2/2003 | Cha et al. |
| 2003/0069902 A1 | * | 4/2003 | Narang et al. ............... 707/203 |
| 2003/0144980 A1 | * | 7/2003 | Holmgren ...................... 707/1 |
| 2003/0172149 A1 | | 9/2003 | Edsall et al. |
| 2003/0195865 A1 | | 10/2003 | Long et al. |
| 2004/0107225 A1 | | 6/2004 | Rudoff |
| 2004/0111422 A1 | | 6/2004 | Devarakonda et al. |
| 2004/0133607 A1 | | 7/2004 | Miloushev et al. |
| 2004/0133652 A1 | | 7/2004 | Miloushev et al. |
| 2004/0167932 A1 | | 8/2004 | Edmonds |
| 2004/0199540 A1 | * | 10/2004 | Nojima ....................... 707/102 |
| 2004/0215772 A1 | | 10/2004 | Dinker et al. |
| 2004/0225922 A1 | | 11/2004 | Susarla et al. |
| 2004/0230560 A1 | | 11/2004 | Elza et al. |
| 2005/0039049 A1 | * | 2/2005 | Chang et al. ............... 713/201 |
| 2005/0050054 A1 | | 3/2005 | Clark et al. |
| 2005/0063324 A1 | | 3/2005 | O'Neill et al. |
| 2005/0091287 A1 | * | 4/2005 | Sedlar ........................ 707/200 |
| 2005/0120040 A1 | | 6/2005 | Williams et al. |
| 2005/0203903 A1 | * | 9/2005 | Rajan et al. ..................... 707/8 |
| 2005/0210034 A1 | | 9/2005 | Howard |
| 2005/0223014 A1 | | 10/2005 | Sharma et al. |
| 2005/0223047 A1 | | 10/2005 | Shah et al. |
| 2005/0234867 A1 | | 10/2005 | Shinkai |
| 2005/0278394 A1 | | 12/2005 | Oks et al. |
| 2005/0283504 A1 | * | 12/2005 | Suzuki et al. |
| 2005/0289143 A1 | * | 12/2005 | Oshri et al. ..................... 707/8 |
| 2006/0129556 A1 | * | 6/2006 | Reuter ............................ 707/8 |
| 2006/0173851 A1 | | 8/2006 | Singh et al. |
| 2008/0215528 A1 | * | 9/2008 | Sedlar ........................... 707/1 |

FOREIGN PATENT DOCUMENTS

| | | |
|---|---|---|
| EP | 0856803 A | 8/1998 |
| GB | 2 269 920 A | 2/1994 |
| WO | WO 97/46956 | 12/1997 |

OTHER PUBLICATIONS

European Patent Office, "Communication Pursuant to Article 96(2) EPC," Appl. No. 00952215.2, dated Oct. 5, 2006, received on Oct. 13, 2006, 7 pages.

Amended Claims, EP App. 00952215.2, 26 pages.

Rao, Herman Chung-Hwa, et al., "An Overview of the Internet File System," 1997, IEEE, XP-002204711, pp. 474-477.

International Searching Authority, "Notification of Transmittal of the International Search Report and the Written Opinion of the International Searching Authority, or the Declaration," PCT/US2005/044134, dated Mar. 29, 2006, 11 pages.

Current Claims, PCT/US2005/044134, 5 pages.

Lu, Hongjun, et al., "T-Tree or B-Tree: Main Memory Database Index Structure Revisited," Database Conference, 2000, IEEE Jan. 31, 2000, XP 010370177, pp. 65-73.

Pullin, D.J., "B-Tree index in a Binary Relational Database," IBM Technical Disclosure Bulletin, IBM Corp., New York, vol. 26, No. 7A, Dec. 1983, XP-000714328, pp. 3423-3426.

International Searching Authority, "Notification of Transmittal of the International Search Report and the Written Opinion of the International Searching Authority, or the Declaration," PCT/US2005/015033, dated Aug. 5, 2005, 12 pages.

Current Claims, PCT/US2005/015033, 5 pages.

No, Jaechun et al., "A Locking Protocol for Distributed File Systems," Parallel and Distributed Computing, Applications and Technologies 5$^{th}$ International Conference, 2004, XP-002337237, pp. 527-530.

International Preliminary Examining Authority, "Notification of Transmittal of the International Preliminary Report on Patentability," PCT/US2005/015033, received Feb. 21, 2007, 7 pages.

Claims as filed on Oct. 13, 2006 for PCT/US2005/015033, 5 pages (attached).

International Preliminary Examining Authority, "Notification of Transmittal of the International Preliminary Report on Patentability," PCT/US2005/044134, dated Mar. 3, 2007, 6 pages.

Claims as filed on Jun. 29, 2006 for PCT/US2005/044134, 3 pages (attached).

Murphy, Nick, et al., "The Design and Implementation of the Database File System", Harvard University, 2002, 12 pages.

Bhattacharya, Supama, et al., "Coordinating Backup/Recovery and Data Consistency between Database and File Systems", ACM, Jun. 2002, 11 pages.

Madore, David, "GCFS: a Garbage-Collected Filesystem for Linux", Feb. 2000, 15 pages.

Mellande, "Unix File system Security", Jun. 2002, 26 pages.

Callaghan, et al., "NFS Version 3 Protocol Specification", RFC 1813, Jun. 1995, 93 pages.

European Patent Office, "Communication Pursuant to Article 96(2) EPC," App. No, 00952215.2, dated Oct. 5, 2006, received on Oct. 13, 2006, 7 pages.

Amended Claims, EP App. 00952215.2, 26 pages.

Rao, Herman Chung-Hwa, et al., "An Overview on the Internet File System," 1997, IEEE, XP-002204711, pp. 474-477.

Oracle, "Oracle iFS (Internet File System)," Mar. 1999, XP-002204710, 3 pages.

\* cited by examiner

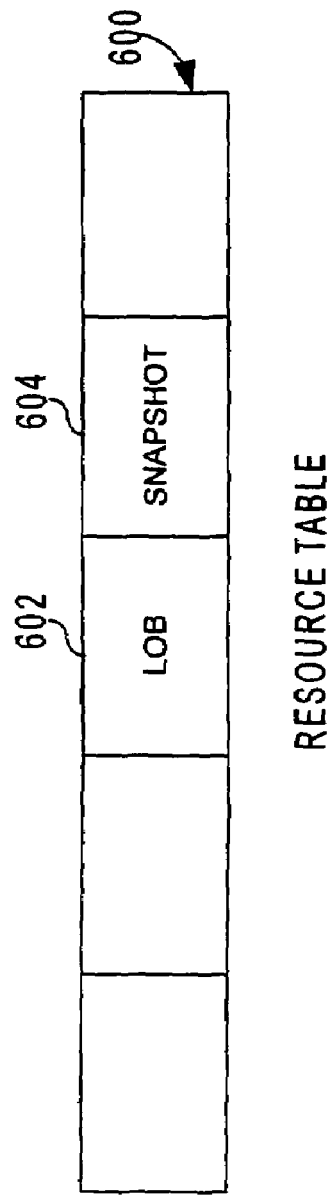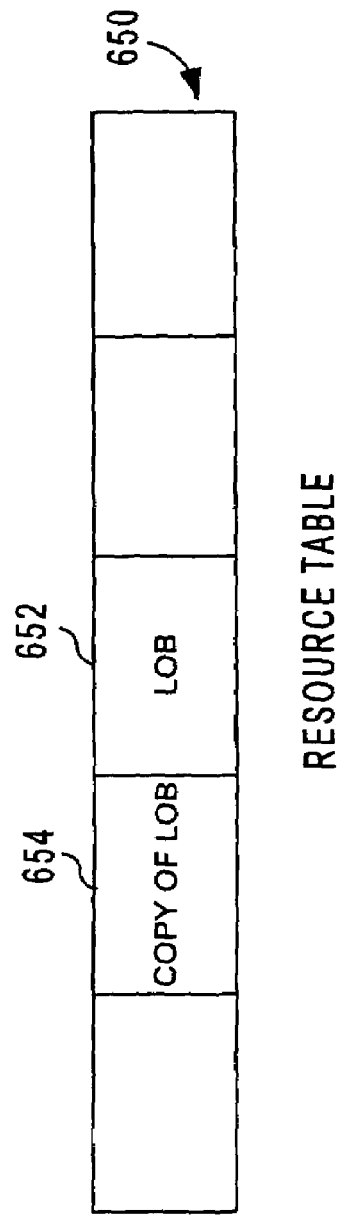

FIG.7
COMPATIBILITY OF VARIOUS TYPES OF FILE SYSTEM OPERATION LOCKS

| | BYTE-READ-WRITE | BYTE-WRITE | DENY-READ | DENY-WRITE |
|---|---|---|---|---|
| BYTE-READ-WRITE | IF NO CONFLICTING RANGE | IF NO CONFLICTING RANGE | YES | YES |
| BYTE-WRITE | IF NO CONFLICTING RANGE | IF NO CONFLICTING RANGE | YES | YES |
| DENY-READ | YES | YES | YES | YES |
| DENY-WRITE | YES | YES | YES | YES |

TECHNIQUES FOR MAINTAINING CONSISTENCY FOR DIFFERENT REQUESTORS OF FILES IN A DATABASE MANAGEMENT SYSTEM

RELATED APPLICATION DATA

This application is related to U.S. patent application Ser. No. 11/013,889 entitled "Techniques for performing transaction semantics for a database server performing file operations," filed Dec. 16, 2004, which is incorporated by reference in its entirety as if fully set forth herein.

This application is also related to U.S. patent application Ser. No. 11/014,354, filed Dec. 16, 2004, entitled "Infrastructure For Performing File Operations By A Database Server," which is incorporated by reference in its entirety as if fully set forth herein.

This application is also related to U.S. patent application Ser. No. 11/013,519, filed Dec. 16, 2004, entitled "Techniques for Providing Locks for File Operations in a Database Management System," which is incorporated by reference in its entirety as if fully set forth herein.

FIELD OF THE INVENTION

The present invention relates to performing file operations in a database management system.

BACKGROUND

Data is stored in a variety of types of storage mechanisms, such as a database and a file server. Each storage mechanism typically has its own means of access. For example, the SQL protocol is typically used to perform operations on a database, and the NFS protocol is typically used to perform operations on a file system. The SQL protocol is an ANSI standard for accessing and manipulating data stored in a database. The NFS protocol is a distributed file system protocol that supports the performance of file operations on files across a network. NFS is a well-known standard for sharing files between UNIX hosts. In the NFS protocol, file system operations are performed on files using a filehandle, which is an identifier that identifies a particular file. The current version of NFS, version 4, which is specified in RFC 3010, supports additional functionality over version 3, such as enhancements to security and to the performance of stateful operations.

Currently, database management systems do not support accessing a database using the NFS protocol. Thus, when a user wishes to access data, the user must ascertain which type of storage mechanism is storing the data to determine to the appropriate manner in which to access the data, e.g., the user must determine whether the data is stored relationally in a database or in a file system. In many circumstances it may be cumbersome for the user to determine in which storage mechanism the data is actually stored.

Further, it is desirable to store as many kinds of data as possible in a single storage mechanism for a variety of reasons. Minimizing of the number of different types of storage mechanisms maintained reduces the amount of resources required to maintain the storage mechanisms. Also, storing many kinds of data in a central location, such as a database, promotes ease of use and security, as data is not stored in a plurality of distributed locations.

Consequently, an approach for performing file system operations within a database management system is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 6A and 6B are block diagrams of storing prior version information for a non-schema-based resource according to embodiments of the invention;

FIG. 7 is a table illustrating various types of file system operation locks, and their compatibility, according to an embodiment of the invention.

DETAILED DESCRIPTION

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring the embodiments of the present invention described herein.

Functional Overview

Techniques are described hereafter in which a database server employs both database locks and file-based locks in servicing requests. A database lock is a lock that is obtained to perform a database operation. The database lock is released when the transaction, in which the database operation was performed, is successfully completed (i.e. commits).

A file-based lock, on the other hand, is a lock that is obtained in response to performing an OPEN operation on a file. The file-based lock is released when a CLOSE file system operation is performed.

As explained in further detail below, when a requestor issues a request for a resource, the version of the resource that the requestor must see may depend on the type of requester. Inconsistent requestors must see all changes that have been committed to a resource, even if the resource is associated with a file that has not been closed since the changes were made. Consistent requestors, on the other hand, must only see changes that were committed to the resource prior to the most recent CLOSE operation performed on the file associated with the resource.

When a resource is the subject of a file-based lock, the database server may create a temporary copy of the resource. Thereafter, any database transactions that change the state of the resource may be made against the temporary copy, instead of modifying the original resource. The database server may use the temporary copy of the resource, which reflects all the current changes that have been made to the resource by database operations, in servicing inconsistent requesters, and may use the original version of the resource in servicing consistent requesters. Advantageously, a plurality of consistent client and a plurality of inconsistent clients may issue requests to a database server while preserving data integrity.

Architectural Overview

Figure 1:
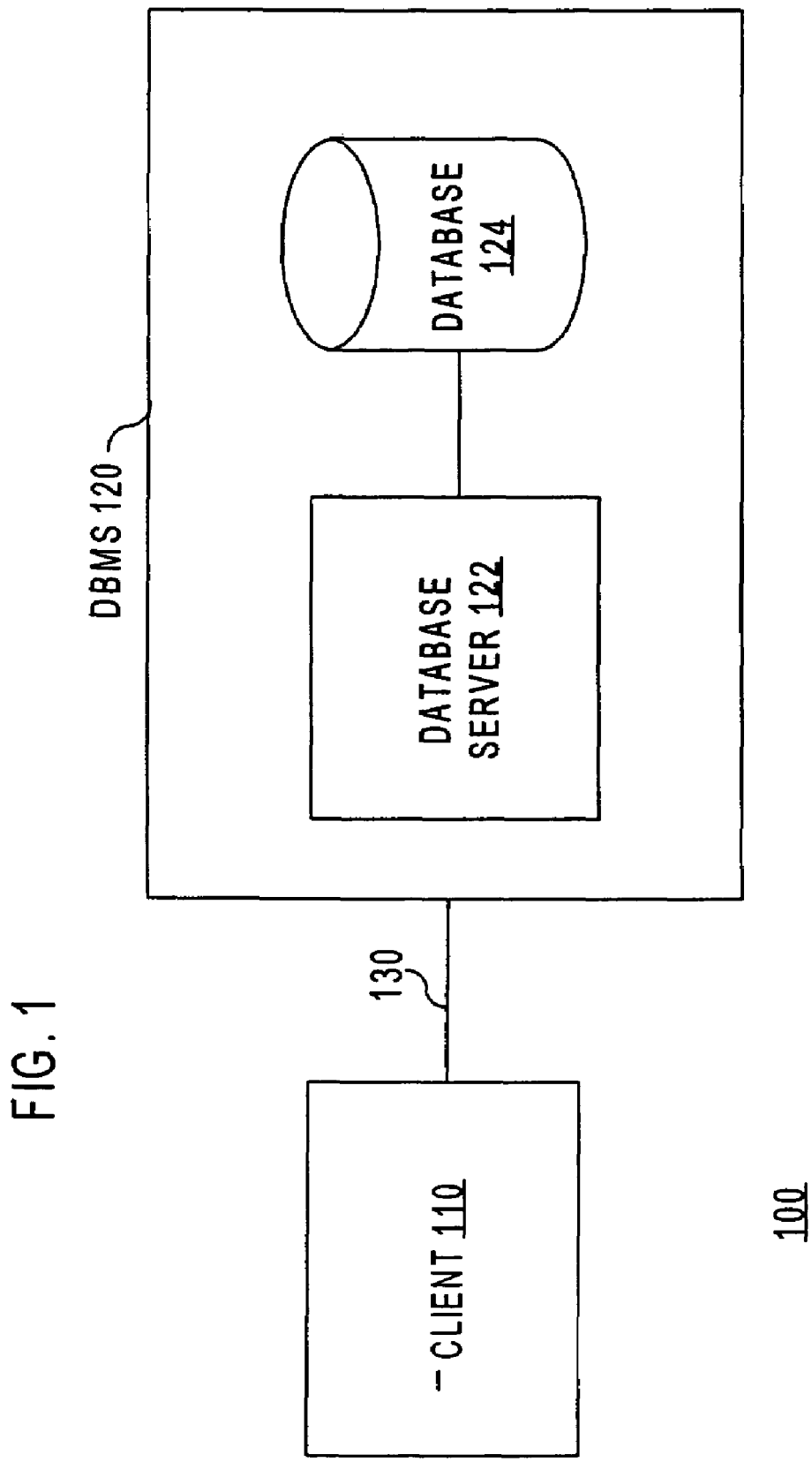
FIG. 1 is a block diagram of a high-level view of a system capable of processing requests implemented in a stateful protocol according to an embodiment of the invention.

FIG. 1 is a block diagram of a system 100 capable of processing a request to perform a file system operation according to an embodiment of the invention. System 100 includes a client 110, database management system (DBMS) 120, and a communications link 130. A user of client 110 may issue a request that specifies performance of one or more file system operations to DBMS 120. For the purpose of explanation, examples shall be given in which the requests conform to a version of NFS, such as version 4.

Client 110 may be implemented by any medium or mechanism that is capable of issuing a request to DBMS 120. Client 110 may issue a stateful request to DBMS 120. As used herein, a "stateful request" is a request for performance of a stateful operation. Typically, stateful requests are issued using a stateful protocol, such as NFS. Non-limiting, illustrative examples of client 110 include an application executing on a device accessible to communications link 130. While only one client is shown in FIG. 1 for ease of explanation, system 100 may include any number of clients 110 that each communicate with DBMS 120 over communications link 130.

Client 110 may be implemented by a medium or mechanism that is capable of issuing multiple requests concurrently. For example, a client 110 may correspond to an application executing on a device, and the application may be comprised of multiple processes that each may transmit requests to DBMS 120. Therefore, to avoid confusion, the term "requester" is used herein to refer to any entity that issues a request to DBMS 120. Thus, a requestor may correspond to client 110, a process executing on client 110, or a process spawned by client 110.

DBMS 120 is a software system that facilitates the storage and retrieval of electronic data. DBMS 120 comprises a database server 122 and a database 124. Database server 122 is implemented using a framework that allows the database server 122 to process any stateful request, such as a request to perform a file operation, on a file maintained in database 124.

The database server 122 may be implemented in a multi-process single-threaded environment, being emulated as a multi-threaded server. A pool of processes that are each capable of performing work reside at database server 122. When database server 122 receives a request, the database server 122 may assign any process in the pool of processes to process the received request. Implementing database server 122 in a multi-process single-threaded environment allows the database server 122 to scale to support a large number of clients 110.

Communications link 130 may be implemented by any medium or mechanism that provides for the exchange of data between client 110 and DBMS 120. Examples of communications link 130 include, without limitation, a network such as a Local Area Network (LAN), Wide Area Network (WAN), Ethernet or the Internet, or one or more terrestrial, satellite or wireless links.

Framework

Figure 2:
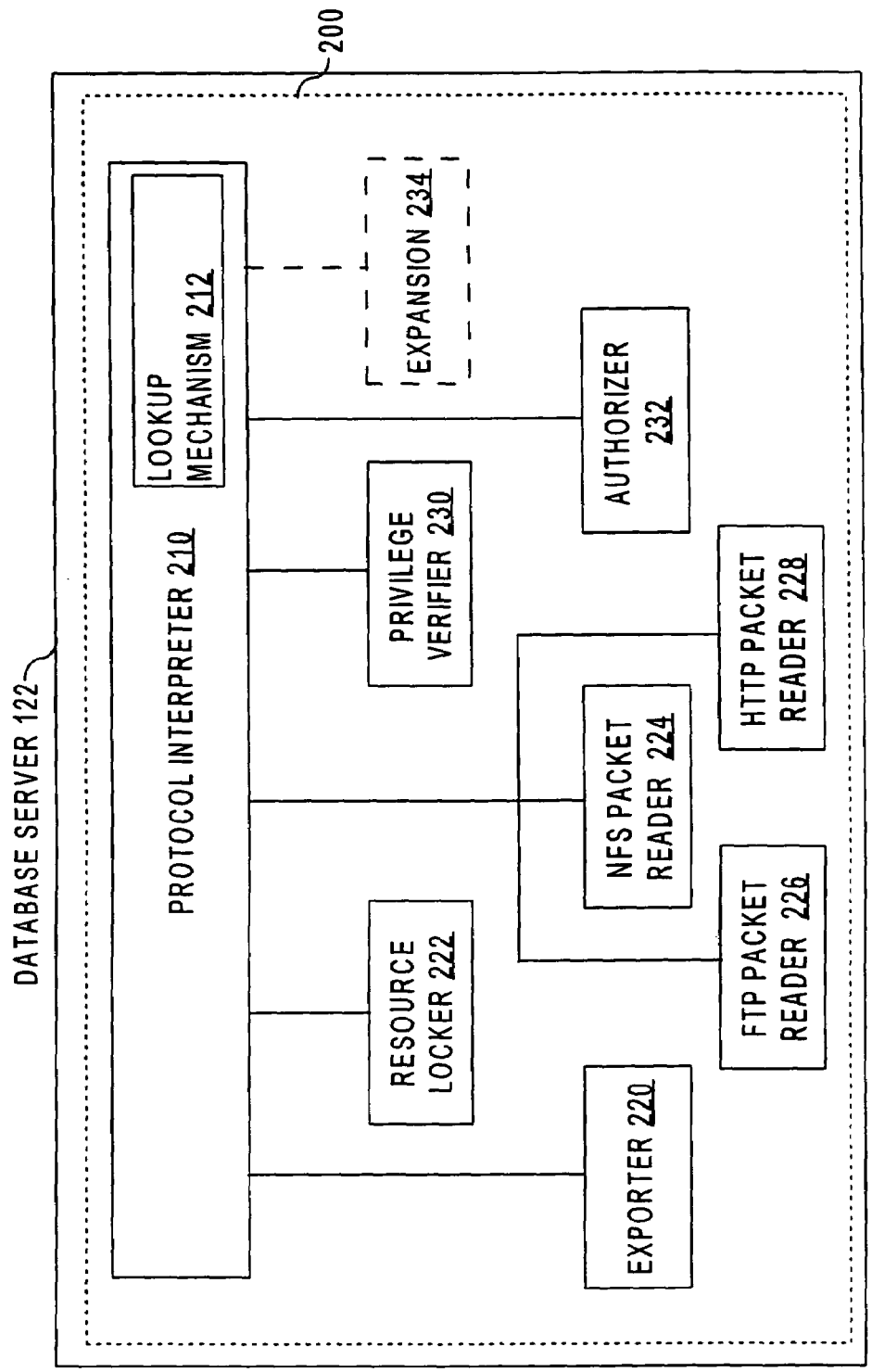
FIG. 2 is a block diagram of the functional components of a database server according to an embodiment of the invention.

FIG. 2 is a block diagram of the functional components of a database server 122 according to an embodiment of the invention. As explained above, database server 122 is implemented using a framework 200 that allows the database server 122 to process stateful requests on files maintained in database 124. Additionally, the same framework 200 may allow the database server 122 to process stateless requests, such as a request implemented in the HTTP or FTP protocol, on data maintained in database 124. Further, as explained below, the framework 200 may be configured to include additional components to support new stateless or stateful protocols or to add new functionality to existing protocols supported by the framework 200.

Each component in the framework 200 of database server 122 is discussed below, and thereafter an explanation of processing an illustrative stateful request using the framework 200 shall be presented in the section entitled "Processing File Operations Using the Framework."

The framework 200 may be implemented with additional components, not shown in FIG. 2, that provide additional functionality required by stateful or stateless requests. For example, expansion 234 refers a component that may be plugged into the framework 200 that allows the framework 200 to support new stateless or stateful protocols or to add new functionality to existing protocols supported by the framework 200. To plug expansion component 234 into the framework 200, protocol interpreter 210 is configured to call expansion component 234 at the appropriate time with the appropriate information.

The Protocol Interpreter

The protocol interpreter 210 receives packets sent to the DBMS 120 over communications link 130. Protocol interpreter 210 may be implemented using any software or hardware component capable of receiving packets from client 110 over communications link 130, and processing the packets as described below. Protocol interpreter 210, upon receiving a packet, identifies a packet type associated with the packet, and sends the packet to a component that is configured to read packets of that packet type. For example, if protocol interpreter 210 determines, by inspecting the header of the packet, that the packet contains a NFS request, then protocol interpreter 210 sends the packet to NFS packet reader 224. After the packet containing the NFS request is read by the NFS packet reader 224, NFS packet reader 224 sends information about individual file system operations specified within the packet back to the protocol interpreter 210 for further processing.

Protocol interpreter 210 contains a lookup mechanism 212. Lookup mechanism 212 may be implemented using any software or hardware component capable of storing state information for requestors of DBMS 120. Lookup mechanism may store state information in volatile storage, and may be implemented using any mechanism, such as B-trees and hash tables, that facilitates the retrieval of state information. An illustrative embodiment of a lookup mechanism 212 is presented in additional detail below in the section entitled "Maintaining State Information."

Protocol interpreter 210 is configured to process operations requested by packets received by the protocol interpreter 210. Protocol interpreter 210 may be configured to perform the operation requested by a received packet, or as explained in further detail below, protocol interpreter 210 may communicate with one or more components of the framework 200 to perform an operation requested by a packet received by the protocol interpreter 210.

The Exporter

Exporter 220 may be implemented using any software or hardware component capable of performing an export operation. An export allows a requestor to view a portion of a directory tree as if the directory tree resided at the requester, instead of the directory tree residing at a server.

In an embodiment, after framework 200 successfully performs an export operation, framework 200 transmits, to the requester of the export operation, (a) information identifying which directory folders are exported to the requestor, and (b) information identifying whether the requestor has read and/or write access to the exported directory folders. When a requestor receives access to a directory folder through an export operation, the requestor may view all the contents, including any child directory folders, of the directory folders to which the requestor has access.

In an embodiment, exporter 220 may maintain information about (a) which requesters have been exported directory folders, and (b) the access permissions associated with any exported directory folders. A directory folder may be exported to a specific client 110 (e.g., exporting a directory folder to a specific IP address or domain name) or to one or more clients, e.g., a directory folder may be exported to a group of related machines by exporting a directory folder to an IP mask.

The Resource Locker

Resource locker 222 may be implemented using any software or hardware component capable of locking a resource. In an embodiment, resource locker 222 is configured to perform byte range locking on files stored in the database 124.

When a lock is required to be performed on a resource, resource locker 222 performs the lock. In the performance of a request to grant a file-based lock, resource locker 222 may update information maintained by the lookup mechanism 212. File-based locks are described in further detail below.

For example, if one embodiment, protocol interpreter 210 may instruct resource locker 222 to perform a file system operation that requests the grant of a file-based lock on a file. Resource locker 222 may access a B-tree to initially determine if the file-based lock may be granted, and if the requested file-based lock may be granted, then the resource locker 222 may update one or more B-trees to reflect that the file-based lock has been granted on the file. The particular B-trees that the resource locker 222 may access or update are discussed in further detail below.

The Packet Readers

Framework 200 includes several packet readers. Each packet reader is designed to read information from packets that conform to a particular protocol. For example, framework 200 includes an NFS packet reader 224, an FTP packet reader 226, and an HTTP packet reader 228.

NFS packet reader 224 may be implemented using any software or hardware component capable of reading and parsing packets that conform to the NFS protocol. Such packets may request one operation, or many operations. A packet that requests two or more file system operations is referred to as a "compound request". The NFS packet reader 224 is configured to read the first operation specified in the packet, and return data that identifies that operation to the protocol interpreter 210. The protocol interpreter 210 may thereafter cause the NFS packet reader 224 to read another operation from the packet once the prior operation has been processed.

FTP packet reader 226 may be implemented using any software or hardware component capable of reading and parsing packets containing FTP requests. FTP packet reader 226 is configured to read and parse the FTP operation information contained within the FTP packet, and thereafter communicate the FTP operation information to the protocol interpreter 210 for processing.

HTTP packet reader 228 may be implemented using any software or hardware component capable of reading and parsing packets containing HTTP requests. HTTP packet reader 226 is configured to read and parse the HTTP operation information contained within the HTTP packet, and thereafter communicate the HTTP operation information to the protocol interpreter 210 for processing.

While FIG. 2 illustrates packet readers for three different types of packet types, namely NFS, FTP, and HTTP packets, other embodiments may comprise additional packet readers for additional types of packets. In this manner, the framework may include components capable of reading any stateless or stateful protocol.

The Privilege Verifier

Privilege verifier 230 may be implemented using any software or hardware component capable of verifying whether a particular requestor has a permission level sufficient to perform a particular file system operation. Protocol interpreter 210 may instruct privilege verifier 230 to determine whether a particular requestor has a permission level sufficient to perform a particular file system operation each time that the protocol interpreter 210 performs a file system operation. The determination of whether a particular user has a permission level sufficient to perform a particular file system operation is discussed in further detail below with reference to step 318 of FIG. 3.

The Authorizer

Authorizer 232 may be implemented using any software or hardware component capable of determining whether the requestor that issued a particular request, received by the protocol interpreter 210, is actually the same requestor identified in the particular request. In this way, the identity of the requestor may be verified by the authorizer 232 before any operation specified in the request is performed. The protocol interpreter 210 may instruct the authorizer 232 to determine whether the requestor that issued a particular request, received by the protocol interpreter 210, is actually the same requester identified in the particular request each time the protocol interpreter 210 receives a request. The determination of whether a particular request was issued by a particular client 110 is described in further detail below with reference to step 316.

Maintaining State Information

In the NFS protocol, file system operations are performed on a file that has been "opened," but not yet "closed." A requestor requests the performance an OPEN file system operation to open a file before the requester may perform other file system operations on the file. After the requestor has performed all desired file system operations on the file, the requestor requests the performance of a CLOSE file system operation to close the file.

A file system operation that is performed by a database server may span one or more database transactions. Consequently, one or more database transactions that each change the state of a file may be performed on the file between the time when the file is opened and when the file is closed.

As NFS is a stateful protocol, it is necessary for the framework 200 to maintain state information when processing stateful requests. State information is information that describes any actions previously performed, by a requestor on a resource, in any session. According to one embodiment, state information is maintained for each file that a requester has opened. For example, if a requestor opened file A and file B, then the requestor would be associated with a first set of state information for file A and a second set of state information for file B.

State information is assigned or updated any time that a requestor: (a) opens or closes a file, or (b) obtains a new lock on an open file. Thus, whenever a requestor either (a) opens or closes a file, or (b) obtains a new lock on an open file, state information is updated to reflect the stateful operations performed on the file.

State information associated with a requestor reflects all the stateful operations performed on the file by the requestor since the file was opened. For example, when a requestor first opens a file, state information A may be assigned. Thereafter, if the same requestor obtains a lock on the file, the state information A becomes invalid, and new state information B is assigned. Note that the state information B reflects both the lock, and the fact that the file is opened by the requestor. Thereafter, if the same requestor obtains a second lock on the file, state information B becomes invalid, and new state information C is assigned. Note that the state information C reflects both locks and the fact that the file is opened by the requestor. When a requestor closes the file, the state information for that requestor, for that file, no longer needs to be maintained.

Keeping Track of the State of Requestor-To-File Relationships

State identification data may accompany communications exchanged between client 110 and database server 122 to refer to the current state of a file referenced in the communication. When a requestor opens a file, state identification data is created by the framework 200. The state identification data identifies the state information associated with the particular requestor with respect to the particular file that the requestor has opened.

In order to keep track of the state of an open file, the newly created state identification data is returned to the requestor. For example, assume that a requestor XYZ issues a request to open a file ABC. The framework 200 generates state identification data that describes the state information associated with the newly opened file ABC, and returns the state identification data to requestor XYZ.

When a requestor transmits a request, to database server 122, to perform a file system operation on an open file, the request contains any state identification data previously transmitted to the requestor, e.g., state identification data may have been previously transmitted to the requestor in response to the file being opened. In this manner, the request identifies the state information associated with the file. For example, if requester XYZ transmits a request for a lock on file ABC, the request will contain the state identification information previously sent to requestor XYZ in response to the database server 122 performing the OPEN file system operation on file ABC. The framework 200 may use the state identification contained in the request to retrieve the corresponding state information using lookup mechanism 212.

Thus, as illustrated above, the framework 200 generates state identification data in response to performing certain stateful file system operations, and the generated state identification data is transmitted to the requestor of the file system operation. Thereafter, the requestor may perform additional stateful file system operations on the same file by including in the request the state identification data, which allows the framework 200 to retrieve the state information for the file using the state identification data.

When a file system operation is performed on an open file, the state information associated with the file is updated to reflect the new operational state of the file. New state identification data is created to refer to the updated state information. Thereafter, the framework 200 transmits the new state identification data to the requestor. In this way, only one set of state identification data is exchanged between the requestor and the framework 200. The state identification data transmitted from the framework 200, after the framework successfully performs a stateful file system operation, identifies the most recent state information associated with the resource that was the subject of the stateful file system operation.

As explained in the next section, the framework 200 may store state information in the lookup mechanism 212, and may retrieve state information stored in the lookup mechanism 212 using the state identification data.

Maintaining State Information

According to one embodiment, state information is maintained using lookup mechanism 212. In one embodiment, lookup mechanism 212 is implemented using a plurality of B-trees. The plurality of B-trees store state information used in processing stateful file system operation requests. For example, the plurality of B-trees may store requestor data, file data, and lock data. Requestor data is data that identifies requestors that are registered to issue file system operations. File data is data that identifies which files have been opened by which requestors. Lock data is data that identifies which locks on which files have been granted to which requestors.

In one embodiment, the plurality of B-trees include a "client B-tree," a "client_exists B-tree," a "requestor B-tree," an "open_files B-tree," an "opens B-tree," a "locks_requestor B-tree," and a "granted_locks B-tree." Each of these B-trees may store state information, and shall be described in further detail below.

Other embodiments of the invention may implement lookup mechanism 212 using a different set of B-trees. For example, several B-trees mentioned above, e.g., the client_exists B-tree, store information that is also stored in other B-trees, and so all the B-trees mentioned above may not be necessary for certain implementations of lookup mechanism 212. However, it may be advantageous to store the same or similar information in more than one B-tree, as the information may be more efficiently accessed using a first key in a first circumstance, and may be more efficiently accessed using a second key in a second circumstance.

In other embodiment of the invention, lookup mechanism 212 may be implemented using a plurality of hash tables, instead of a plurality of B-trees. The plurality of hash tables implementing the lookup mechanism 212 stores information similar to that described hereafter. Other mechanisms may also be employed by other embodiments of the invention to implement lookup mechanism 212.

The Client B-Tree

The client B-tree is a B-tree that maintains information about clients. Each client 110 that has registered with the framework 200 will be reflected in an index entry within the client B-tree. A client 110 registers with the framework 200 by issuing a request to establish a client identifier, as explained in further detail below. The key of the client B-tree is a client identifier previously assigned to the client by the database server. A client identifier uniquely identifies a particular client 110 registered with the framework 200. Each node of the client B-tree stores the information about a particular client, including the client identifier and a client-provided identifier, such as a network address of the client.

The Client_Exists B-Tree

Similar to the client B-tree, the client_exists B-tree maintains information about clients. While both the client B-tree and the client_exists B-tree maintain information about clients, the key of the client-exists B-tree is a client-provided identifier. The client-provided identifier may be, for example, the network address of the client.

The client_exists B-tree may be used to determine, based on the client-provided identifier, whether a particular client 110 has registered with the framework 200. Each index entry of the client_exists B-tree also stores the information about a particular client, including the client identifier and a client-provided identifier.

The Requestor B-Tree

The requester B-tree is a B-tree that maintains information about requesters. The key of the requestor B-tree reflects both a client identifier associated with a requestor and a requestor identifier that uniquely identifies the requestor. The requestor B-tree may be used to determine all requestors associated with a particular client 110, which may be needed during the processing of an OPEN file system operation or when recovering a client that has become inoperable.

Each index entry of the requestor B-tree stores the information about a requestor. For example, an index entry of the requestor B-tree that corresponds to a particular requestor may store information about which client is associated with the requester, when the last communication from the requestor was received, which files the requestor has opened, and what state information is associated with the requestor.

The Open_Files B-Tree

The open_files B-tree is a B-tree that maintains information about files that have been opened. The key of the open_files B-tree is the filehandle of a file. The open_files B-tree may be used to determine whether it is possible to perform a file system operation on a particular file. Each index entry of the open_files B-tree may store information about an open file. Such information may include, for example, the number of file-based locks on the open file, the type of file-based locks on the open file, what state identification data identifies state information associated with the open file, an object identifier for the open file.

The Opens B-Tree

The opens B-tree is a B-tree that maintains information about files that have been opened. The key of the opens B-tree is state identification data. By traversing the opens B-tree, one can locate information about the open file associated with the state information identified by the state identification data used as the key to the opens B-tree.

For example, assume that a client has opened a particular file. The state information maintained for the client will indicate that the client has opened the particular file. The state information will be assigned to a set of state identification data. The state identification data may be used to traverse the opens B-tree to find an index entry that indicates that the particular file is open.

Each index entry of the opens B-tree stores information about an open file, such as state identification data that identifies state information associated with the open file, the requestor that opened the open file, whether the file was opened for reading or writing, whether the open file has been modified, and whether reading or writing has been denied to any other requestor other than the one which opened the open file.

To open a file, state identification data is generated to identify the open file. The state identification data is (a) transmitted to the requestor that requested the file to be open, and (b) used to add an entry to the opens B-tree to reflect that the file has been opened.

The Locks_Requestor B-Tree

The locks_requestor B-tree is a B-tree that maintains information about lock requestors. The key to the locks_requestors B-tree is a state identification data. Each index entry of the locks B-tree contains information about the requester of a lock, such as the client identifier, the requestor identifier, and the lock owner identifier. The lock owner identifier uniquely identifies a particular requestor that is granted a lock. The client identifier and the requestor identifier are assigned by the framework 200, and the lock owner identifier is supplied by the requestor.

The Granted_Locks B-Tree

The granted_locks B-tree is a B-tree that maintains information about granted locks. The key to the granted_locks B-tree tree is a filehandle. The granted_locks B-tree may be used to quickly determine which file-based locks, if any, have been granted on a particular file.

When the protocol interpreter 210 instructs resource locker 222 to perform a file system operation that requests the grant of a particular lock, resource locker 222 may access one or more B-trees of lookup mechanism 212. To illustrate, assume that protocol interpreter 210 receives a request for a grant of a particular lock on a file, and thereafter protocol interpreter 210 instructs resource locker 222 to process the file system operation. Resource locker 222 may initially determine if a conflicting lock has already been granted on the file by accessing the granted locks B-tree. The resource locker 222 may traverse the granted locks B-tree using the filehandle of the file identified by the file system operation. If an entry in the granted locks B-tree exists for the filehandle, an examination of the entry will inform the resource locker 222 whether a conflicting lock has already been granted on the file.

If the resource locker 222 determines that a conflicting lock has not already been granted on the file, then the resource locker 222 may (a) generate new state identification data to identify the new state of the resource, and (b) add an entry to the granted_locks B-tree to reflect the grant of the requested lock. The resource locker 222 may add a new entry to the granted_locks B-tree using the newly generated new state identification data for the resource, and thereafter, delete the prior entry in the locks B-tree that was referenced by the prior state identification data. The new entry in the locks B-tree contains reference to all the prior stateful operations performed on the resource, so it is unnecessary to store the entry referenced by the prior state identification data.

Processing File Operations Using the Framework

Figure 3:
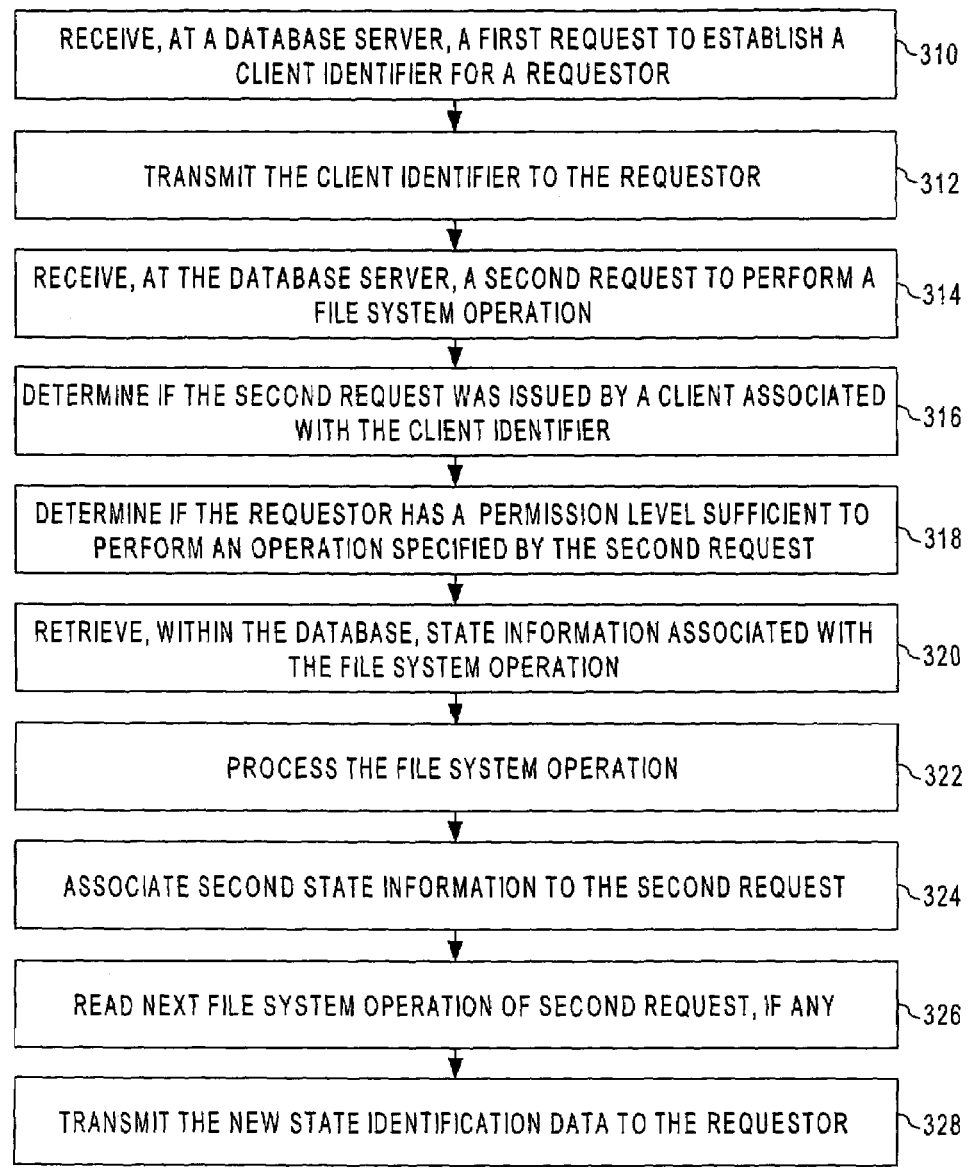
FIG. 3 is a flowchart illustrating the functional steps of processing a file operation according to an embodiment of the invention.

FIG. 3 is a flowchart illustrating the steps for processing a file system operation according to an embodiment of the invention. By performing the steps of FIG. 3, a stateful operation, such as a stateful NFS operation, may be performed by DBMS 120.

In general, the framework maintains state information about the operations that the framework performs. Upon performing a stateful operation, the framework passes back to a requestor state identification data that corresponds to the state of the operation. In a subsequent request for a stateful operation, the requestor sends the state identification data back to the framework. The framework then uses the state identification data as a key to identify the state information that applies to the operation in that subsequent request.

Obtaining a Framework-Generated Client Identifier

Referring to FIG. 2, initially, in step 310, a first request to establish a client identifier for a requestor is received at a database server. Step 310 may be performed by protocol interpreter 210 receiving a packet, containing the first request, sent by client 110 over communications link 130.

Protocol interpreter 210 may receive packets of a variety of packet types. While protocol interpreter 210 is configured to identify the packet type of a received packet, the protocol interpreter 210 does not need to be configured to read each packet type. Protocol interpreter 210 may determine the packet type of a received packet, for example, by inspecting information contained within the header of the packet. Once the protocol interpreter 210 determines the packet type of the received packet, the protocol interpreter 210 sends the packet to a component responsible for reading packets of that packet type.

For the purpose of explanation, it shall be assumed that the packet received in step 310 is an NFS packet that contains a request to establish a client identifier for a requester. Establishing a client identifier is a NFS operation. Under these circumstances, the protocol interpreter will send the packet to NFS packet reader 224 to read the packet. NFS packet reader 224 reads and parses the packet, and sends data that identifies the requested file system operation (i.e. establishing a client identifier) back to the protocol interpreter 210.

After receiving the data that identifies the file system operation, the protocol interpreter 210 processes the file system operation. In the present example, the protocol interpreter 210 processes the request to establish a client identifier. As part of processing the request, the protocol interpreter 210 may, for example, consult lookup mechanism 212 to determine (a) whether a client identifier has been established for the requestor yet, and (b) if no client identifier has been established for the requestor yet, then determining what client identifier should be associated with the requestor.

In an embodiment, the database server may traverse the client_exists B-tree based on a client-provided identifier (such as the client's network address) to determine whether a client identifier has been established for the particular requestor. If a client identifier has not been established for the requestor, then the database server may generate a client identifier for the client. After generating the client identifier for the client, the database server may add index entries to the client B-tree and the client_exists B-tree to store information about the new client identifier assigned to the requestor.

After the performance of step 310, processing proceeds to step 312. In step 312, the client identifier, which was established above in step 310, is transmitted to the requester. Step 312 may be performed by protocol interpreter 210 transmitting a communication that contains the client identifier to the requestor over communications link 130. In an embodiment, the requestor may verify the received client identifier with the database server 122 by exchanging additional communications with the database server 122 to verify the client identifier. After the performance of step 312, processing proceeds to step 314.

Receiving a Compound Request

In step 314, a second request to perform a file system operation is received. Step 314 may be performed by protocol interpreter 210 receiving a packet, containing the second request, sent by client 110 over communications link 130. The second request includes the client identifier.

To illustrate the processing of a compound request, assume that the second request received in step 314 is a compound request that contains two or more file system operations. File system operations specified in a compound request are processed sequentially by the framework 200.

To illustrate the processing of a stateful file system operation request, further assume that the first file system operation specified in the second request is a request for a file-based lock on a file that has been previously opened by the requestor. After the framework 200 opens a file, the framework 200 (a) generates state identification data that identifies the state information associated with the opened file, and (b) transmits the state identification data to the requestor. Thus, if the request received in step 314 is a request to perform a file system operation on an open file, the request received in step 314 contains the state identification data previously sent to the requestor. In this example, the state identification data will allow the framework 200 to reference the state information associated with the file that is the subject of the request for the file-based lock.

After the protocol interpreter 210 determines that the request of step 314 contains a file system operation request, the protocol interpreter 212 may send the packet containing the request of step 314 to the NFS packet reader 224 to read the packet. Thereafter, the NFS packet reader 224 transmits information to the protocol interpreter 210 about the first unprocessed file system operation (referred to below as the "current" file system operation) specified in the packet. The framework 200 shall process additional unprocessed file system operations specified in the packet after the current file system operation has been processed, as described in further detail below.

Assigning the Request to a Session

Once the protocol interpreter 210 receives the information about the current file system operation specified in the compound request from the NFS packet reader 224, the protocol interpreter 210 assigns the current file system operation to a database session. The assigned database session, which may be selected from a pool of database sessions, is the session in which the database server will process the file system operations contained within the compound request. As state information is maintained separately from sessions (as explained above, state information is maintained in lookup mechanism 212), any session may be selected from the pool of database sessions to service the current file system operation. After the performance of step 314, processing proceeds to step 316.

Authenticating the Client

In step 316, a determination is made as to whether the request received in step 314 was issued by the client identified by the client identifier contained within the request. In an embodiment, each time a request is received, the request is authenticated to confirm the identity of the requestor. Step 316 may be performed by the protocol interpreter 210 communicating with authorizer 232 to cause authorizer 232 to authenticate the request. Authorizer 232 may use the client identifier contained within the request in the authentication process. After the authorizer 232 authenticates the request received in step 314, the authorizer 232 communicates the results of the authentication process to the protocol interpreter 210. Authorizer 232 may authenticate the requestor using standard authentication libraries and protocols, including Kerberos, LIPKEY, and SPKM-3.

If the request received in step 314 is not authenticated by the authorizer 232, then the protocol interpreter 210 sends a communication to the requestor that sent the second request (received in step 314) to inform the requestor that the second request was not authenticated. Once the second request is authenticated, then processing proceeds to step 318.

Determining Whether the Requested Operation is Permitted

In step 318, a determination is made as to whether the requester has a permission level sufficient to perform the current file system operation. Step 318 may be performed by the protocol interpreter 210 communicating with privilege verifier 230 to cause privilege verifier 230 to verify whether the requestor has a permission level sufficient to perform the current file system operation.

In an embodiment, privilege verifier 230 determines whether a requestor has a permission level sufficient to perform a specified file system operation using an access control list for each requester. Privilege verifier 230 maintains an access control list for each requestor. Each access control list contains a list of access control entries (ACEs). Each ACE identifies whether the requester is granted or denied a specific privilege.

To illustrate, assume that requestor 1234 has issued a request to perform a file system operation that requires privilege A and privilege B. Privilege verifier 230 maintains a list of ACEs for requestor 1234. Privilege verifier 230 processes ACEs specified in the access control list sequentially. If the access control list for requestor 1234 contained: a first ACE that indicated that requestor 1234 was granted permission A, a second ACE that indicated that requestor 1234 was granted permission B, and a third ACE that indicated that requestor 1234 was denied permission A, then privilege verifier 230 will determine that requestor 1234 has a sufficient permission level to perform the requested file system operation, because the privilege verifier 230 will process ACEs in the access control list sequentially until a determination can be made.

Thus, once the privilege verifier 230 reads the second ACE in the access control list for requestor 1234, the privilege verifier 230 can make a determination about whether requestor 1234 has a sufficient permission level to perform the requested file system operation, and privilege verifier 230 will not read the remainder of the access control list. After the performance of step 318, processing proceeds to step 320.

Locating the Appropriate State Information

In step 320, if the performance of the current file system operation requires state information, then the appropriate state information is retrieved based on the state identification data contained within the second request. The state identification data may have been previously assigned and communicated to the requester, e.g., the requestor may have previously opened a file or may have been previously granted a lock on a file. The state information retrieved in step 320 may be associated with the current file system operation if the request is a compound request. Step 320 may be performed by protocol interpreter 210 retrieving state information using lookup mechanism 212. The state information retrieved in step 320 includes any state information necessary to perform the current file system operation. After the processing of step 320, processing proceeds to step 322.

Executing the Requested File System Operation

In step 322, the current file system operation is processed, within the selected database session, based on the appropriate state information. In one embodiment, step 322 may be performed by protocol interpreter 210 itself. In another embodiment, protocol interpreter 210 may communicate with other components of the framework 200 to cause the other components to perform the current file system operation. After the current file system operation has been processed, processing proceeds to step 324.

Updating the State Information

In step 322, the file system operation is performed in a session. The state used by the session changes by virtue of the performance of the file system operation. In the present example, the state information that represents the state of that session shall be referred to as "updated state information." The updated state information reflects state changes that resulted from the processing of the current file system operation. For example, the updated state information reflects whether the file, that is the subject of the file system operation, has been opened and whether any locks have been granted on the file. Thus, the updated state information reflects the current state of the file after the current file system operation has been performed against the file.

In step 324, information stored within the lookup mechanism 212 is updated to reflect the updated state information associated with the current file system operation. In an embodiment, one or more B-trees comprising the lookup mechanism 212 are updated to indicate the new state of the session. The B-trees comprising the lookup mechanism 212 may be updated by (a) generating a new state identification data to identify the updated state information, and (b) updating or adding entries to the appropriate B-trees of lookup mechanism 212 to reflect the updated state information.

For example, assume that in step 322, the current file system operation that was processed in step 322 was an operation to perform a file-based lock on the first 100 bytes of a particular file. Resource locker 222 may initially determine if a conflicting lock has already been granted on the file by accessing the granted locks B-tree. The resource locker 222 may traverse the granted locks B-tree using the filehandle of the file identified in the current file system operation. If an entry in the granted locks B-tree exists for the filehandle, an examination of the entry will inform the resource locker 222 whether a conflicting lock has already been granted on the file.

If the resource locker 222 determines that a conflicting lock has not already been granted on the file, then the resource locker 222 (a) generates new state identification data to identify the new state of the resource, and (b) adds an entry to the granted locks B-tree to reflect the grant of the requested lock. Specifically, the resource locker 222 may add a new entry to the granted_locks B-tree using the newly generated new state identification data for the resource, and thereafter, delete the prior entry in the locks B-tree that was referenced by the prior state identification data. The new entry in the granted_locks B-tree contains reference to the file-based lock granted on the first 100 bytes of the file, in addition to any prior lock granted on the resource, so it is unnecessary to store the entry referenced by the prior state identification data.

After the performance of step 324, processing proceeds to step 326.

Iterating Through Operations Specified in a Compound Request

Each request may be a compound request that specifies one or more file system operations to be performed. In step 326, if the request received in step 314 is a compound request, and there are additional unprocessed file system operations specified in the compound request, then processing proceeds to step 318, wherein the next unprocessed file system operation specified in the second request of step 314 becomes the "current file system operation." In this manner, each file system operation specified in a compound request is sequentially processed by the framework 200.

After all file system operations specified in the second request of step 314 have been processed, processing proceeds to step 328.

Providing the Requestor with Results and a Revised State Identifier

In step 328, the results of performing all the file system operations specified in the request of step 314 are transmitted to the requestor in a communication. The communication may contain any state identification data that identifies state information that was assigned to a particular resource that was the subject of a successfully performed file system operation. The performance of step 328 may be performed by protocol interpreter 210 sending, to the requester, the results of processing each file system operation of a compound request, along with any state identification data generated in response to performing a stateful file system operation. For example, if the requestor had requested that a read-write lock be granted on a particular range of bytes on a file that the requester had previously opened, protocol interpreter 210 may perform step 328 by sending the requester a communication that includes new state identification data that identifies the new state of the resource, i.e., that the read-write lock was granted on a particular range of bytes on a particular file. Note that new state identification information is transmitted to the requestor in response to the successful processing of stateful file system operations, but not in response to the successful processing of stateless file system operations.

In the NFS protocol, the results of processing multiple file system operations specified in a compound request may be transmitted in a single communication to the requestor. Thus, the state identification data transmitted to the requestor in step 328 may be sent in a single communication by the communication that includes state identification information for each successfully performed stateful file system operation specified in a compound request.

If the framework 200 is unable to process a particular file system operation in a compound request, then a single communication is transmitted to the requestor. The communication includes information that describes (a) the results, including any new state identification information, of processing the file system operations specified in the compound request that were processed, and (b) information indicating which file system operation could not be performed.

Processing Stateless Transactions Using the Framework

The framework 200 may also process stateless requests, such as a stateless file system operation or a request that conforms to a stateless protocol. When protocol interpreter 210 receives a packet that contains a stateless request, the protocol interpreter 210 may transmit the packet to a component to read and parse the packet. For example, protocol interpreter 210 sends packets containing FTP requests to FTP packet reader 226 and protocol interpreter 210 sends packets containing HTTP requests to HTTP packet reader 228.

After reading and parsing a stateless request, FTP packet reader 226 and HTTP packet reader 228 transmit information identifying the stateless request to protocol interpreter 210. The protocol interpreter 210 may, in turn, perform the stateless request or communicate with another component of the framework 210 to perform the stateless request, e.g., resource locker 222 may be required to lock a resource. As the request is stateless, it is not necessary to assign state information to the request once the request has been successfully performed.

Relationship Between File System Operations and Database Transactions

When a client wishes to write to a file, the client may request to performance of an OPEN file system operation, then multiple write file system operations, and then the CLOSE file system operation. For the purposes of this section, a single file system operation refers to multiple NFS operations, starting from the OPEN file system operation to the corresponding CLOSE file system operation. To perform a single file system operation, the database server 122 may be required to cause one or more database transactions to be performed. Each of the one or more database transactions is committed before the file system operation is performed. Thus, changes made to database 124 by a particular database transaction are committed before it is known whether the performance of the file system operation will be successful.

Thus, as explained in further detail below in the next several sections, a requestor who wishes to view a resource may expect to view either (a) a version of the resource that currently reflects any committed database transactions, or (b) a version of the resource that only reflects completed file system operations, and does not reflect any committed database transactions that correspond to a file system operation that has not yet been completed.

Open Committed Changes

Requestors may independently issue OPEN and CLOSE commands on the same resource. Thus, even though a CLOSE command may close a file relative to one requester, the file may still not be closed relative to all requestors. The term "last close" refers to a CLOSE file system operation that results in a file being closed relative to all requestors. Thus, any resource that is currently opened by one or more requestors has not had the last close performed on the resource.

Multiple database transactions, that each change the state of a file, may be performed between the time the file is opened, and the time of the last close. Changes performed on a file may be committed before the last close on the file is performed. Changes that (1) have been committed in the database, but (2) involve a file that has not had the last close, are referred to herein as "open-committed changes."

Inconsistent Clients

When a last close has not been performed on a resource and a requestor sends a request to obtain the resource, the state of the resource that the requestor should receive depends on the type of client associated with the requestor. An "inconsistent client" is a client that expects to view the "current state" of the resource. In this context, the current state of the resource includes any open-committed changes made to the resource, but does not include any uncommitted changes made to the resource.

For example, if two database committed transactions have changed the state of a resource since the resource was first opened, and a last close has not been performed on the resource, an inconsistent client that issues a request for the resource expects the view the state of the resource that reflects the changes made by the two database transactions. A client that accesses the DBMS 120 using the NFS, FTP or HTTP protocol is an example of an inconsistent client. A requestor associated with an inconsistent client will be an inconsistent requestor, i.e., the requestor will expect to view the current state of the resource.

Consistent Clients

A consistent client is a client that is not allowed to see any open-committed changes. Rather, consistent clients see only committed changes that were made to a resource either (a) before the resource was opened, if the resource has been opened, but not closed, or (b) after a last-close has been performed on the resource. For example, assume that a resource has been opened, but a last close has not been performed on the resource. A consistent client, which requests access to the resource, expects to view a state of the resource just prior to the performance of the OPEN operation.

Thus, if two committed database transactions have changed the state of a resource since the resource was opened, and a last close has not been performed, then a consistent client that issues a request for the resource expects the view the state of the resource that does not reflect the changes made by the two transactions. For ease of explanation, the state of the resource that must be seen by a consistent client shall be referred to as the "closed-committed" version of the resource.

A client that accesses the DBMS 120 using the SQL protocol is an example of a consistent client. Any requestor associated with a consistent client will be a consistent requestor, i.e., the requestor will expect to view the state of the resource in a closed-committed state.

To illustrate further, the following file system operations and points in time occur in the following order:
(1) time t1
(2) Requestor 1 open file f1
(3) Requestor 1 commits a change to the file f1
(4) time t2
(5) Requestor 2 opens file f1
(6) Requestor 2 commits a change to the file f1
(7) time t3
(8) Requestor 1 closes the file f1
(9) time t4
(10) Requestor 2 closes the file f1
(11) time t5

At time t3, the consistent version of the file f1 is the file at time t1, and the inconsistent version of the file is the file at time t3. At time t4, the consistent version of the file f1 is the file at time t1, and the inconsistent version of the file is the file at time t4. At time t5, the consistent version of the file f1 is the file at time t5, and the inconsistent version of the file is the file at time t5. As a consistent client expects to view a prior state of the resource, that state must be preserved until the last close is performed on the resource.

Reconstructing the Close-Committed Version

In order for the framework 200 to support consistent requesters and inconsistent requestors, the framework 200 employs different types of locks, namely database locks and file-based locks. A database lock is a lock that is obtained in response to performing a database operation, and the database lock is released when the database operation has successfully completed (committed). A file-based lock is a lock that is obtained in response to performing an OPEN file system operation, and the file-based lock is released when a CLOSE file system operation is performed.

Figure 4:
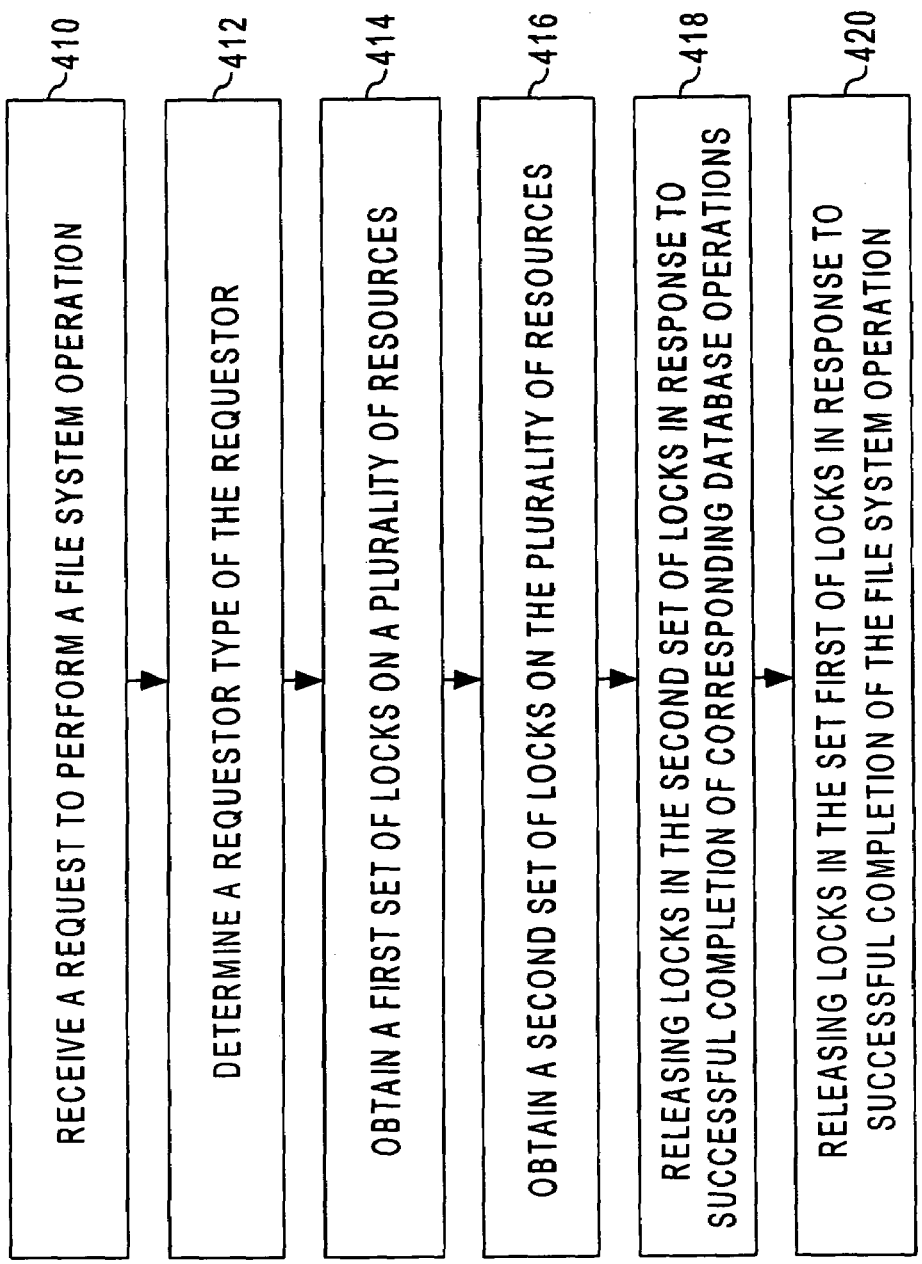
FIG. 4 is a flowchart illustrating the functional steps of using database locks and file system operation locks according to an embodiment of the invention.

FIG. 4 is a flowchart illustrating the functional steps of using database locks and file-based locks according to an embodiment of the invention. In step 410, a requestor requests an operation that involves a particular resource. Step 410 may be performed by client 110 sending a request to database server 122 over communications link 130. After the performance of step 410, processing proceeds to step 412.

In step 412, a determination is made as to the requestor type of the requestor. Step 412 may be performed by the database server 122. Based on the requestor type, the database server 122 determines which version of the particular resource to send to the requestor. If the requestor is an inconsistent requestor, then the database server 122 sends the current version of the particular resource. However, if the requestor is a consistent requester, then the database server 122 sends an older version of the particular resource, namely, the closed-committed version of the resource.

The determination of the requestor type may be performed based on the type of protocol to which the request conforms. If the request conforms to the SQL protocol, then the requestor is a consistent requestor. However, if the request conforms to the NFS, FTP, or HTTP protocol, then the requestor is an inconsistent requester. After the performance of step 412, processing proceeds to step 414.

In step 414, to perform the requested operation, a first lock on the particular resource is obtained. The first lock is a first type of lock, such as a file-based lock. After the performance of step 414, processing proceeds to step 416.

In step 416, to perform each database operation required by the requested operation, a second lock is obtained. The second lock is a second type of lock, such as a database lock.

In an embodiment, prior to performing any database operation that changes the state of a particular resource, a temporary copy of the resource is stored in the database 124. When a file-based lock has been granted on the particular resource, changes to the particular resource are reflected in the temporary copy of the resource, rather than the actual resource itself. Because the original version of the resource remains unmodified, the original version may be used by database server 122 in servicing consistent requestors. The database server 122 may use the temporary copy of the resource in servicing inconsistent requestors, as the temporary copy reflects all the changes that have been made to the resource by committed database operations. After the performance of step 416, processing proceeds to step 418.

In step 418, database locks are released in response to successful completion of the corresponding database operation. When the operation is performed by a database system, the database system commits the transaction used to perform the operation, and releases the database locks that are held on all resources that were modified during the operation. After all database operations required by the requested operation have been performed, processing proceeds to step 420.

In step 420, file-based locks are released in response to successful completion of the file system operation. Specifically, when the last close is performed on the resource, the file-based lock on the resource is released, and the temporary copy of the resource may be established as the current version of the resource. The temporary copy may be established as the current version, for example, by copying the temporary copy over the original copy, and then deleting the temporary copy.

After the file system operation is performed, the inconsistent version of the resource and the closed-committed version of the resource are the same. Consequently, both consistent requestors and inconsistent requestors may be serviced using the original version of the resource until the resource is opened again.

By performing the steps of FIG. 4, file-based locks and database locks may be used to enable database server 122 to service both consistent requesters and inconsistent requestors. When a file-based lock is maintained on a resource, the state of the resource prior to the performance of the OPEN file system operation is maintained, thus allowing the database server 122 to service consistent requesters.

Managing Concurrent Accesses

The use of file-based locks is equally advantageous when multiple requestors are performing operations that involve the same resource. For example, multiple requestors may each issue requests to perform file system operations on the same file. More than one requestor may open a file, and more than one requestor may make changes to the state of the resource.

To illustrate, assume that a first requestor has opened a file and has made changes to the file. When a second requestor sends a request, to database server 122, for a version of the same file, database server 122 determines the requestor type of the second requestor. If the second requestor is a consistent requestor, then the database server 122 provides a version of the file that does not reflect any changes made to the file by the first requestor since the file has opened. If the second requestor is an inconsistent requestor, then the database server 122 provides a version of the file that reflects the changes made to the file by the first requestor since the file has been opened.

Further information about how a database server may maintain the state of a resource while the resource is the subject of a file-based lock is described below in the section entitled "Performing Transaction Semantics."

Performing Transaction Semantics

There are numerous reasons why it is advantageous to maintain information about a prior version of the resource once the resource has been the subject of an OPEN file system operation. First, as explained above, maintaining a prior version of the resource once the resource has been the subject of an OPEN file system operation, but has not been the subject of a last close, allows the database server 122 to service requests for resources from consistent requestors. Second, maintaining a prior version of a resource allows the database server to revert the resource to the prior version. It may be necessary to revert a resource to a prior version in a variety of circumstances, such as when (a) a requestor creates an incorrect version of a resource, (b) a requestor creates a version of a schema-based resource that is not compatible with the schema, or (c) the changes performed on a resource by multiple requestors are not compatible with each other.

Significantly, the changes that need to be removed from a resource to revert the resource to a prior state may include committed changes. Consequently, conventional undo mechanisms used by database systems to remove changes made by uncommitted transactions are not sufficient to perform the necessary reversion.

Embodiments of the invention advantageously allow a resource to be reverted to a prior state, even if committed database transactions that have changed the state of the resource from the prior state have been performed. According to an embodiment of the invention, one or more changes are made to a resource by committed database transactions. After the committed database transactions have change the state of the resource, a request to revert the resource to a state prior to the changes made by the committed database transactions is received. For example, client 110 may issue a request to database server 122 to revert a particular file to a state prior to a particular point in time, such as the closed-committed version of the file.

In response to receiving the request, the resource is reverted to the state prior to the particular point in time, such as the point in time when the file was opened. In reverting the resource, the current state of the resource ceases to reflect the changes that were made to the file by the committed database transactions. Techniques for reverting resources to a prior state shall be discussed in further detail in the next section.

Resource Reversion Techniques

Various techniques may be used to revert resources to a state prior to a particular point in time. The particular technique used may depend, for example, on whether the resource is a schema-based resource or a non-schema-based resource. A schema-based resource is a resource that conforms to a defined schema. For example, a purchase order document conforming to a given schema is an example of a schema-based resource. A non-schema-based resource is any resource that is not a schema-based resource.

Storing Resources in Deconstructed Form

Schema based resources may be stored in a constructed form by storing the entire resource together, e.g., storing an XML document in a lob column of a database table. Alternatively, it may be advantageous to store a schema-based resource in a deconstructed form by storing the elements comprising the schema-based resource separately. For example, data describing individual XML tags, and their associated data, of the XML document may be stored in a column of a database table. Because the elements of the schema-based resource are stored separately, the elements of the schema-based resource may need to be reconstructed before the schema-based resource is read.

Figure 5:
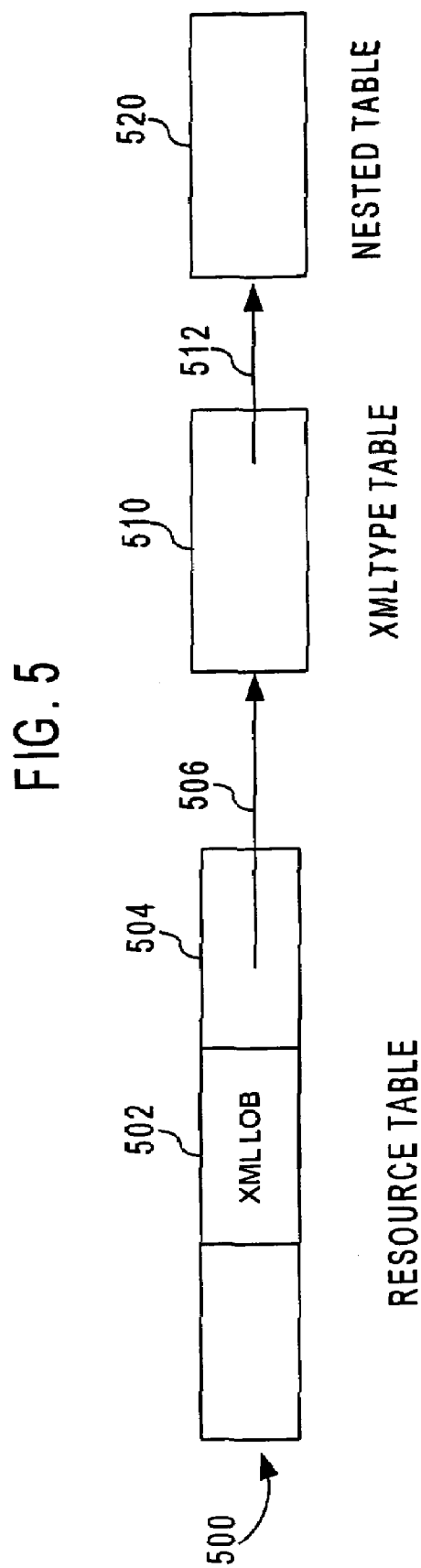
FIG. 5 is a block diagram of storing prior version information for a schema-based resource according to an embodiment of the invention.

FIG. 5 illustrates a resource table that shows a mechanism for storing a schema-based resource in a deconstructed form. The table of FIG. 5 contains a reference column 504. Data describing the schema-based resource may be stored in or referenced by the resource table. For example, reference column 504 of the resource table contains a pointer 506 that identifies another table, namely the XML Type table 510, where data regarding the schema-based resource is stored. The XML type table 510 may itself refer to one or more other tables that store other data elements of the schema-base resource. For example, XML Type table 510 is shown with a reference 512 to nested table 520.

XML Type table 510, and any nested table 502, stores data about elements of the schema-based resource. When a requestor wishes to read the first 100 bytes of a schema-based resource, the resource must be reconstructed to service that request, because the XML Type table 510 does not store information that describes at which byte does each data element of a schema-based resource appear. Consequently, when data is read from a schema-based resource, the schema-based resource must be reconstructed and stored in a XML lob column 502. If a requestor wishes to read the first 100 bytes of a schema-based resource, then such a request may easily be performed, by database server 122, by reading the first 100 bytes of the reconstructed resource stored in the XML lob column 502.

As shall be explained in further detail below, subsequent operations may be performed on the reconstructed copy of the resource stored in the XML lob column 502, while leaving the deconstructed elements of the resource stored in the XML Type Table 510, and any nested table 520, intact.

Reverting a Schema Based Resource

According to one embodiment, schema based resources are reverted based on "prior version information." FIG. 5 is a block diagram of a system that stores prior version information for a schema-based resource according to an embodiment of the invention. The prior version information may be maintained in the XML Type Table 510, and any nested table 520, while changes made to the schema-based resource may be performed on the reconstructed copy of the resource stored in the XML lob column 502 until a last-close is performed on the schema-based resource.

In an embodiment of the invention, when a file-based lock is granted on a resource, immediately prior to the performance of a database operation that may change the state of the resource, a constructed copy of the schema-based resource is created. For example, the constructed copy of the schema-based resource may be created and stored in XML lob column 502.

Thereafter, the constructed copy of the resource (the copy of the resource stored in the XML lob column 502) is treated as the current version of the resource, and the changes required by the database operation are made to the constructed copy of the resource (the copy of the resource stored in the XML lob column 502). In effect, the copy of the resource in the XML lob column 502 becomes a cache of the dirty version of the resource. Note that the deconstructed version of the schema-based resource is still maintained in the XML Type Table 510.

To revert a schema-based resource to the deconstructed copy of the resource, the copy of the resource that is stored in the XML lob column 502 is deleted. Thereafter, the deconstructed version of the resource that is stored in the XML Type table 510, and any nested table 520, is treated as the current version of the resource instead of the constructed copy stored in the XML Type table 510.

When a CLOSE file system operation is performed on the resource, the changes made to the deconstructed copy of the resource stored in the XML Type table 510 may be made permanent by changing the deconstructed version of the resource stored in the XML Type table 510, and any nested table 520, to reflect the constructed copy of the resource stored in the XML lob column 502.

Using a Snapshot Time to Revert a Non-Schema-Based Resource

FIGS. 6A and 6B are block diagrams of storing prior version information for a non-schema-based resource according to embodiments of the invention. FIGS. 6A and 6B shall be used to discuss three different approaches for storing prior version information for non-schema-based resources.

According to a first approach, as shown in FIG. 6A, a resource table 600 stores a non-schema-based resource in a LOB column 602. In this approach, when an OPEN file system operation is performed on the resource, a snapshot time is stored in a column 604 of the resource table 600. The snapshot time indicates a logical time immediately prior to when the OPEN file system operation is performed on the resource.

After one or more database transactions have committed changes to the resource, the database transactions may not be "undone," but the resource may be reverted to the state as of the snapshot time using undo information associated with the resource since the snapshot time. Undo information refers to information, maintained by the DBMS 120, that may be used to "roll back" or undo a database transaction that has been performed, but not committed.

The snapshot time and the undo information are used to apply a set of changes to the resource to change the state of the resource to reflect the state of the resource at the time of the snapshot time. Once the resource has been reverted to reflect the state of the resource at the time of the snapshot time, the snapshot time is removed from column 604 of the resource table 600.

In an embodiment, a "flashback query" may be used to apply a set of changes to the resource to change the state of the resource to reflect the state of the resource at the time of the snapshot time. Techniques for performing a flashback query are described in U.S. patent application Ser. No. 10/427,511, entitled "Flashback Database," filed Apr. 30, 2003, which is incorporated by reference in its entirety as if fully set forth herein.

Using a Cache Column to Revert a Non-Schema-Based Resource

According to a second approach, as shown in FIG. 6B, a resource table 650 stores a non-schema based resource in a LOB column 652. In this approach, when an OPEN file system operation is performed on the resource, a copy of the resource is stored in column 654 of resource table 650. Column 654 is used as a "cache column." Specifically, the copy of the resource stored in column 654 is treated as the current version of the resource. When a database transaction effects a change to the resource, the change is made to the copy of the resource stored in column 654 instead of the original resource stored in column 652.

If a CLOSE file system operation is performed on the resource, then the copy of the resource stored in 654 may be stored in column 652, so the original resource will reflect any changes made to the resource by committed database operations. Until the CLOSE file system operation is performed, the current value of the resource stored in column 652 reflects the state of the resource just prior to the performance of the OPEN file system operation. Therefore, if it is necessary to revert the resource to the state of the resource just prior to the performance of the OPEN file system operation, then the only change to resource table 650 that needs to occur is to remove the copy of the resource stored in column 654. Before the last close is performed on the resource, inconsistent requesters may view the copy of the resource in column 654, and consistent requesters may view the resource stored in column 652.

Hybrid Approach

Due to storage space constraints, undo information older than a certain time is typically overwritten by newer undo information. Consequently, using a snapshot time to perform the reversion (i.e. the first approach) is not always feasible. However, when the undo information is available, the snapshot-time based reversion may be preferable to cache-column reversion (i.e. the second reversion).

Consequently, in a third (hybrid) approach, the snapshot-based approach discussed above is performed, unless the database server 122 determines that undo information for the resource may not be available at the time that the resource may need to be reverted. If the database server 122 determines that undo information for the resource may not be available at the time that the resource may need to be reverted, then the cache-column approach discussed above is then performed.

The database server 122 may determine that undo information for the resource may not be available at the time the resource may need to be reverted if the amount of time that undo information is maintained by the database server 122 is less than a configurable amount of time.

Consistency Checking

According to one embodiment, the consistency of a modified file is checked at the time the file is closed, and there are no more pending OPEN file system operations. For example, a schema-based resource may be checked to ensure that the schema-based resource conforms to the rules of the schema. If the schema-based resource does not conform to the corresponding schema, then the resource may be reverted back to the state of the resource at the time it was opened.

As discussed above, if a resource is the subject of a granted file-based lock, and either the requestor issues a request to revert the resource back to an earlier state, or if the resource fails a consistency check, then the resource may be reverted back an earlier state as discussed above. Further details and advantages of file-based locks shall be presented below.

File-Based Locks

File-based locks enable database server 122 to perform file system operations on files maintained in database 124. Resource locker 222 may manage the file system locks on resources stored in database 124. The behavior of file-based locks is different than other locks used for stateless protocols, such as HTTP, in three important aspects.

First, file-based locks may be granted on a portion of a resource, instead of just on the entire resource. In particular, file-based locks may be granted on a range of bytes on a resource. Thus, a single file may be the subject of multiple file-based locks, wherein each file-based lock covers a different byte range of the file.

Second, file-based locks are leased based, which means that once a particular file-based lock is granted to a requester, the particular lock is granted for a first period of time, after the expiration of which the particular lock expires. However, any communication received by the requestor renews the particular lock for a second period of time. Thus, a requestor may continually renew a file-based lock as long as the requestor communicates with the database server 122 before the file system lock expires.

Once a particular file system lock expires, the lookup mechanism 212 is updated to reflect that the particular lock is no longer granted. Data maintained within lookup mechanism 212 may be periodically checked to ensure that each lock requested by a requestor is still valid.

When a particular requester requests a lock that conflicts with another lock previously granted, the lock that was previously granted may be checked to ensure that the prior granted lock is still valid. If the prior granted lock is no longer valid, then information stored in lookup mechanism 212 is updated to reflect that the lock is invalid (e.g., information about the lock may be deleted). Also, all locks that have been granted to a particular client are released when the particular client has expired. In an embodiment, a client may expire after a configurable amount of time elapses since the client last communicated with the framework 200. Thus, if a prior granted lock conflicts with a lock that is requested to be granted, then the client associated with the prior granted lock may be checked to verify that the client is still valid. If the client is not valid, then the prior granted lock is released, and the lock that is requested to be granted may be performed. The determination of whether a particular client has expired may be performed by checking the client B-tree, in an embodiment of the invention.

The third difference of file-based locks over stateless protocol locks is that there are no file-based locks that solely offer read access. Instead, to the extent that file-based locks grant read access, file-based locks also grant read-write access.

In an embodiment of the invention, the file-based locks include a first set that covers the entire resource, and a second set that covers a part of the resource, such as a range of bytes of the resource. FIG. 7 is a table illustrating various types of file-based locks, and their compatibility, according to an embodiment of the invention. Each of the various file-based locks shown in FIG. 7 shall be briefly described below.

The byte-read-write file-based lock is a lock upon a part of the resource. The byte-read-write file-based lock may be used to grant read and write access to a range of bytes on a resource.

The byte-write file-based lock is a lock upon a part of the resource. The byte-write file-based lock may be used to grant write access to a range of bytes on a resource.

The deny-read file-based lock is a lock upon the entire resource. The deny-read file-based lock may be used to deny read access to a resource to any requestor other than the one granted the deny-read lock.

The deny-write file-based lock is a lock upon the entire resource. The deny-write file-based lock may be used to deny write access to a resource to any requestor other than the one granted the deny-write lock.

File-based locks are not compatible with lock-shared or lock-exclusive locks, such as WebDAV locks. FIG. 7 describes the compatibility of various file-based locks. When a particular file-based lock is incompatible with another lock previously granted, then the file-based lock will not be granted. Thus, a byte-read-write lock may be granted on a resource that already has a byte-write lock granted upon it, if the ranges of the byte-read-write lock and the byte-write lock do not conflict. However, a deny-read lock cannot be granted on a resource that already has a byte-write lock granted upon it.

File-Based Locks in a Real Application Cluster

Database 122 may be implemented in a Real Application Cluster (RAC), such as using Oracle Corporation's RAC 10g option. In a RAC environment, when a file-based lock is granted on a resource, data must be stored in database 124 that describes which database server granted the file-based lock on the resource.

For example, a resource, stored in a database, may be associated with (a) a flag that indicates that a file-based lock has been granted on the resource and (b) information identifying the database server that granted the file-based lock on the resource. Lookup mechanism 212 maintains data about the granted file-based locks in memory. If information about the granted file-based locks is to be visible to other nodes in a RAC instance, then the information stored in memory must be persistently stored or be transportable to other nodes of the RAC in a manner that maintains data consistency. If information stored in lookup mechanism 212 is not visible to other database servers of the RAC other than the database server in which it resides, then any file-based lock granted by a first database server could conflict with the file-based locks of a second database server.

The above described file-based locks, employed by database server 122, allow database server 122 to process stateful requests, such as requested NFS operations, on files maintained by database 124. Consequently, client 110 may access files stored in database 124 using the NFS protocol in a manner that perverse data consistency, as database 122 may employ the above described file system operations locks.

Implementing Mechanisms

Figure 8:
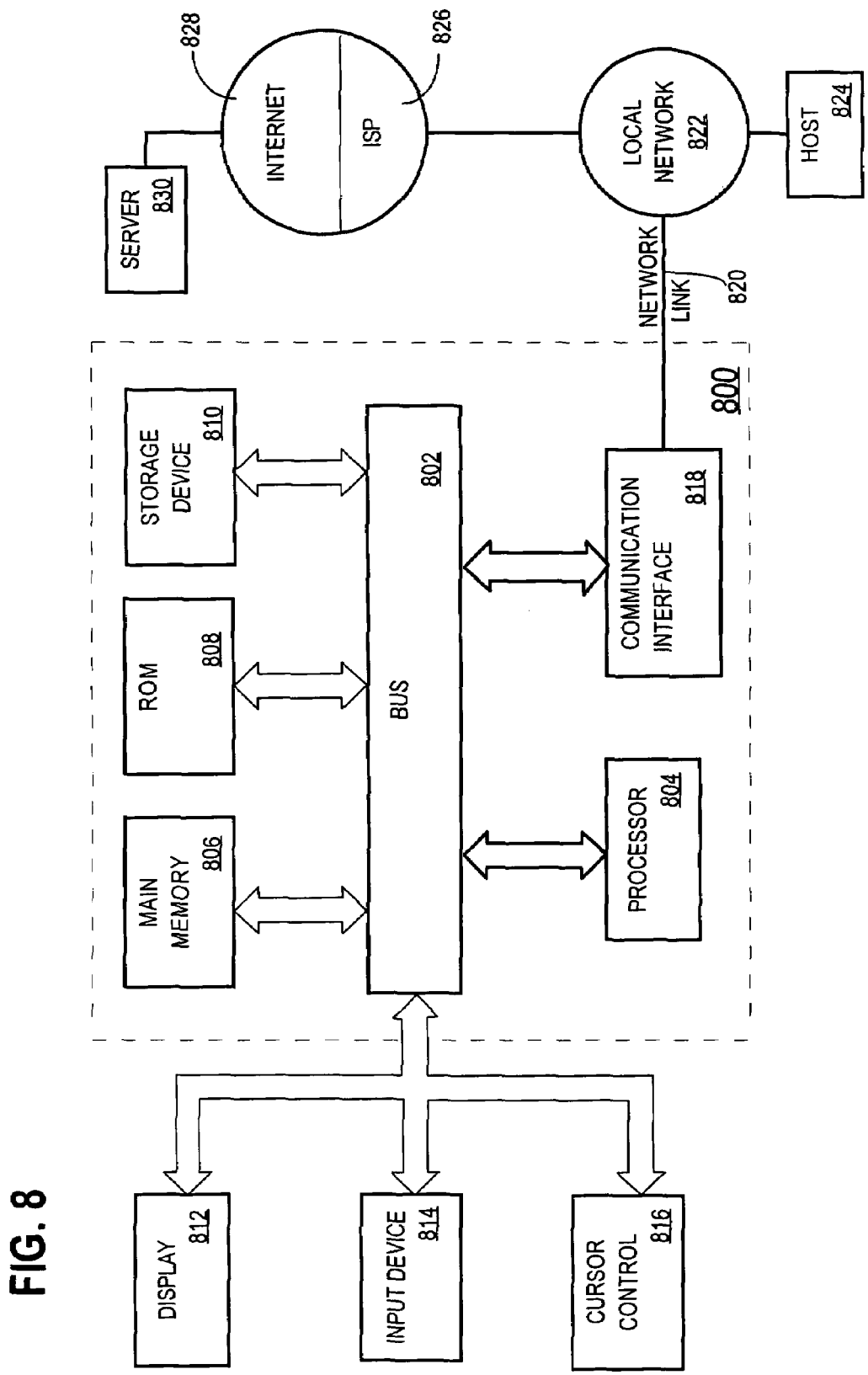
FIG. 8 is a block diagram that illustrates a computer system upon which an embodiment of the invention may be implemented.

A client 110, database server 122, and a database 124 may each be implemented on a computer system according to an embodiment. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:

receiving a request to perform a file system operation, wherein performance of said file system operation requires performance of a plurality of database operations involving one or more resources;

performing said file system operation, wherein performing said file system operation comprises the steps of:

obtaining a first set of locks that apply to said one or more resources, wherein each lock in said first set of locks is a first type of lock;

wherein the first type of lock is a file-based lock;

performing said plurality of database operations in a plurality of database transactions;

for each database transaction of said plurality of transactions, obtaining a second set of locks on the resources, of said one or more resources, that are involved in database operations that are performed during said database transaction, wherein each lock in said second set of locks is a second type of lock;

wherein the second type of lock is database lock;

releasing locks of said second type of lock in response to successful completion of the corresponding database transaction;

wherein releasing locks of said second type includes releasing a lock on a particular resource involved in a particular database transaction upon successful completion of the database transaction prior to successful completion of said file system operation; and releasing locks of said first type of lock in response to successful completion of said file system operation.

2. The method of claim 1, further comprising:

receiving, from a requestor, a request for a particular resource of said one or more resources;

determining which version of the particular resource to provide to the requestor based on (a) the requestor type of the requestor and (b) which types of locks are currently held on the particular resource.

3. The method of claim 2 wherein:

a lock of the first type is held on the particular resource;

no lock of the second type is held on the particular resource;

if the requestor is a first type of requestor, then the requestor is provided a current version of the particular resource; and if the requestor is a second type of requestor, then the requestor is provided a version of the particular resource that does not reflect any changes that were made since the lock of the first type was granted on the particular resource.

4. The method of claim 3 wherein:

if the request is in the form of a database command, then the requestor qualifies as the first type of requestor; and if the request is in the form of a file system operation request, then the requestor qualifies as the second type of requestor.

5. The method of claim 2, wherein said step of determining which version of the particular resource to provide to the requestor comprises the step of:

determining whether said requestor is receive an older version of said particular resource or a newer version of said particular resource based on said requestor type.

6. The method of claim 2, wherein said step of determining which version of the particular resource to provide to the requestor comprises the step of:
  determining said requestor type based, at least in part, on the type of protocol associated with said second request.

7. The method of claim 1, further comprising the steps of:
  prior to performing any database operation that changes a particular resource of said one or more resources, storing a temporary copy of said particular resource; and
  making changes to said particular resource by making changes to said temporary copy, as long as a particular lock, of said first set of locks, is held on said particular resource.

8. The method of claim 1, further comprising the steps of:
  prior to performing a database operation, in said plurality of database operations, that changes a particular resource of said one or more resources, storing a snapshot time in association with said particular resource, wherein the snapshot time indicates a logical time prior to the performance of said database operation; and
  reconstructing a version of the particular resource prior to the performance of said plurality of database operations using said snapshot time.

9. The method of claim 8, further comprising the step of:
  providing said reconstructed version of the particular resource to a file system client.

10. The method of claim 1, wherein said step of performing said plurality of database operations comprises the steps of:
  making a first copy of a particular resource, of said one or more resources, based on an original version of said particular resource;
  establishing said first copy as the current version of said particular resource;
  making said change to said first copy; and
  committing said change to said first copy.

11. The method of claim 10, wherein said first copy is a constructed version of said resource, and wherein said original version of said resource is a deconstructed version of said resource.

12. The method of claim 11, wherein the step of making said first copy comprises the steps of:
  constructing said constructed version of said resource based on said deconstructed version of said particular resource; and
  storing said constructed version of said particular resource in a particular column of a database table.

13. The method of claim 10, wherein:
  the particular resource is stored in a database,
  said step of copying said original version of said particular resource to said first copy comprises storing said first copy in a LOB column in a row of a database table within said database, and
  said row is associated with said original version of said particular resource.

14. The method of claim 1, wherein said step of performing said plurality of database operations comprises the following steps:
  if certain criteria are satisfied, then
  making a copy of a particular resource,
  establishing the copy as the current version of the particular resource, and
  committing the change to the copy;
  if said certain criteria are not satisfied, then
  storing a snapshot time that reflects a particular point in time wherein the change is committed to the copy, and
  committing the change to the current version of the particular resource without making a copy of the current version of the resource.

15. The method of claim 14 wherein the certain criteria is based on whether undo information associated with said change will be retained for a particular amount of time.

16. The method of claim 1, wherein said step of performing said plurality of database operations comprises the steps of:
  storing a snapshot time with a particular resource of said one or more resources, wherein said snapshot time indicates a logical time prior to when a change is committed to said particular resource;
  making said change to said particular resource.

17. The method of claim 16, further comprising the step of:
  reconstructing said particular resource to reflect a state identified by said snapshot time using undo information.

18. A computer-readable storage medium carrying one or more sequences of instructions which, when executed by one or more processors, causes the one or more processors to perform the steps of:
  receiving a request to perform a file system operation, wherein performance of said file system operation requires performance of a plurality of database operations involving one or more resources;
  performing said file system operation,
  wherein performing said file system operation comprises the steps of:
    obtaining a first set of locks that apply to said one or more resources, wherein each lock in said first set of locks is a first type of lock;
    wherein the first type of lock is a file-based lock;
    performing said plurality of database operations in a plurality of database transactions;
    for each database transaction of said plurality of transactions, obtaining a second set of locks on the resources, of said one or more resources, that are involved in database operations that are performed during said database transaction, wherein each lock in said second set of locks is a second type of lock;
    wherein the second type of lock is database lock;
    releasing locks of said second type of lock in response to successful completion of the corresponding database transaction;
      wherein releasing locks of said second type includes releasing a lock on a particular resource involved in a particular database transaction upon successful completion of the database transaction prior to successful completion of said file system operation; and
  releasing locks of said first type of lock in response to successful completion of said file system operation.

19. The computer-readable storage medium of claim 18 further carrying one or more sequences of instructions which, when executed by one or more processors, causes the one or more processors to perform the steps of:
  receiving, from a requestor, a request for a particular resource of said one or more resources;
  determining which version of the particular resource to provide to the requestor based on (a) the requestor type of the requestor and (b) which types of locks are currently held on the particular resource.

20. The computer-readable storage medium of claim 19 wherein;
  a lock of the first type is held on the particular resource;
  no lock of the second type is held on the particular resource;

if the requestor is a first type of requestor, then the requestor is provided a current version of the particular resource; and if the requestor is a second type of requestor, then the requestor is provided a version of the particular resource that does not reflect any changes that were made since the lock of the first type was granted on the particular resource.

21. The computer-readable storage medium of claim 20 wherein, if the request is in the form of a database command, then the requestor qualifies as the first type of requestor;and if the request is in the form of a file system operation request, then the requestor qualifies as the second type of requestor.

22. The computer-readable storage medium of claim 19 wherein said step of determining which version of the particular resource to provide to the requestor comprises the step of:

determining whether said requestor is to receive an older version of said particular resource or a newer version of said particular resource based on said requestor type.

23. The computer-readable storage medium of claim 19 wherein said step of determining which version of the particular resource to provide to the requestor comprises the step of:

determining said requestor type based, at least in part, on the type of protocol associated with said second request.

24. The computer-readable storage medium of claim 18 further carrying one or more sequences of instructions which, when executed by one or more processors, causes the one or more processors to perform the step of:

prior to performing any database operation that changes a particular resource of said one or more resources, storing a temporary copy of said particular resource; and making changes to said particular resource by making changes to said temporary copy, as long as a particular lock, of said first set of locks, is held on said particular resource.

25. The computer-readable storage medium of claim 18 further carrying one or more sequences of instructions which, when executed by one or more processors, causes the one or more processors to perform the steps of:

prior to performing a database operation, in said plurality of database operations, that changes a particular resource of said one or more resources, storing a snapshot time in association with said particular resource, wherein the snapshot time indicates a logical time prior to the performance of said database operation; and reconstructing a version of the particular resource prior to the performance of said plurality of database operations using said snapshot time.

26. The computer-readable storage medium of claim 25 further carrying one or more sequences of instructions which, when executed by one or more processors, causes the one or more processors to perform the step of:

providing said reconstructed version of the particular resource to a file system client.

27. The computer-readable storage medium of claim 18, wherein said step of performing said plurality of database operations comprises the steps of:

making a first copy of a particular resource, of said one or more resources, based on an original version of said particular resource;

establishing said first copy as the current version of said particular resource;

making said change to said first copy; and committing said change to said first copy.

28. The computer-readable storage medium of claim 27 wherein said first copy is a constructed version of said resource, and wherein said original version of said resource is a deconstructed version of said source.

29. The computer-readable storage medium of claim 28 wherein the step of making said first copy comprises the step of:

constructing said constructed version of said resource based on said deconstructed version of said particular resource; and storing said constructed version of said particular resource in a particular column of a database table.

30. The computer-readable storage medium of claim 27 wherein:

the particular resource is stored in a database, said step of copying said original version of said particular resource to said first copy comprises storing said first copy in a LOB column in a row of a database table within said database, and said row is associated with said original version of said particular resource.

31. The computer-readable storage medium of claim 18 wherein said step of performing said plurality of database operations comprises the following steps:

if certain criteria are satisfied, then making a copy of a particular resource, establishing the copy as the current version of the particular resource, and committing the change to the copy;

if said certain criteria are not satisfied, then storing a snapshot time that reflects a particular point in time wherein the change is committed to the copy, and committing the change to the current version of the particular resource without making a copy of the current version of the resource.

32. The computer-readable storage medium of claim 31 wherein the certain criteria is based on whether undo information associated with said change will be retained for a particular amount of time.

33. The computer-readable storage medium of claim 18 wherein said step of performing said plurality of database operations comprises the steps of:

storing a snapshot time with a particular resource of said one or more resources, wherein said snapshot time indicates a logical time prior to when a change is committed to said particular resource;

making said change to said particular resource.

34. The computer-readable storage medium of claim 33 further carrying one or more sequences of instructions which, when executed by one or more processors, causes the one or more processors to perform the step of:

reconstructing said particular resource to reflect a state identified by said snapshot time using undo information.

* * * * *

UNITED STATES PATENT AND TRADEMARK OFFICE
CERTIFICATE OF CORRECTION

| | | |
|---|---|---|
| PATENT NO. | : 7,548,918 B2 | Page 1 of 3 |
| APPLICATION NO. | : 11/013890 | |
| DATED | : June 16, 2009 | |
| INVENTOR(S) | : Namit Jain et al. | |

It is certified that error appears in the above-identified patent and that said Letters Patent is hereby corrected as shown below:

Title Page;

On face page, in field (57), in column 2, in "Abstract", line 5, delete "requesters." and insert -- requestors. --, therefor.

On face page, in field (57), in column 2, in "Abstract", line 16, delete "requesters." and insert -- requestors. --, therefor.

On page 2, in column 2, under "Other Publications", line 24, delete "Computing," and insert -- Computing; --, therefor.

On page 2, in column 2, under "Other Publications", line 30, delete "/015033," and insert -- /015033 (50277-2766), --, therefor.

On page 2, in column 2, under "Other Publications", line 35, delete "/044134," and insert -- /044134 (50277-2938), --, therefor.

On page 2, in column 2, under "Other Publications", line 51, delete "on" and insert -- of --, therefor.

In column 2, line 63, delete "requester." and insert -- requestor. --, therefor.

In column 3, line 11, delete "requesters," and insert -- requestors, --, therefor.

In column 3, line 13, delete "requesters." and insert -- requestors. --, therefor.

In column 3, line 46, delete ""requester"" and insert -- "requestor" --, therefor.

In column 5, line 15, delete "requester," and insert -- requestor, --, therefor.

In column 5, line 19, delete "requester" and insert -- requestor --, therefor.

Signed and Sealed this

Eighth Day of June, 2010

David J. Kappos
*Director of the United States Patent and Trademark Office*

In column 5, line 28, delete "requesters" and insert -- requestors --, therefor.

In column 6, line 58, delete "requester" and insert -- requestor --, therefor.

In column 7, line 2, delete "requester" and insert -- requestor --, therefor.

In column 7, line 17, delete "requester" and insert -- requestor --, therefor.

In column 7, line 41, delete "requester," and insert -- requestor, --, therefor.

In column 7, line 65, delete "requester," and insert -- requestor, --, therefor.

In column 8, line 2, delete "requester" and insert -- requestor --, therefor.

In column 9, line 39, delete "requester" and insert -- requestor --, therefor.

In column 9, line 40, delete "requesters." and insert -- requestors. --, therefor.

In column 9, line 51, delete "requester," and insert -- requestor, --, therefor.

In column 10, line 35, delete "requester" and insert -- requestor --, therefor.

In column 11, line 51, delete "requester." and insert -- requestor. --, therefor.

In column 11, line 67, delete "requester." and insert -- requestor. --, therefor.

In column 12, line 13, delete "requester." and insert -- requestor. --, therefor.

In column 13, line 40, delete "requester" and insert -- requestor --, therefor.

In column 13, line 49, delete "requester." and insert -- requestor. --, therefor.

In column 13, line 52, delete "requester" and insert -- requestor --, therefor.

In column 14, line 16, delete "requester," and insert -- requestor, --, therefor.

In column 15, line 53, delete "requester," and insert -- requestor, --, therefor.

In column 15, line 59, delete "requester" and insert -- requestor --, therefor.

In column 15, line 60, delete "requester" and insert -- requestor --, therefor.

In column 17, line 9, delete "requester," and insert -- requestor, --, therefor.

In column 18, line 31, delete "requesters" and insert -- requestors --, therefor.

In column 18, line 54, delete "requester," and insert -- requestor, --, therefor.

In column 18, line 62, delete "requester." and insert -- requestor. --, therefor.

In column 19, line 44, delete "requesters" and insert -- requestors --, therefor.

In column 19, line 48, delete "requesters." and insert -- requestors. --, therefor.

In column 23, line 31, delete "requesters" and insert -- requestors --, therefor.

In column 23, line 33, delete "requesters" and insert -- requestors --, therefor.

In column 24, line 25, delete "requester," and insert -- requestor, --, therefor.

In column 24, line 38, delete "requester" and insert -- requestor --, therefor.

In column 28, line 65, in claim 5, after "is" insert -- to --.

In column 30, line 41, in claim 18, after "is" insert -- a --.

In column 30, line 64, in claim 20, delete "wherein;" and insert -- wherein: --, therefor.

In column 31, line 10, in claim 21, delete "wherein," and insert -- wherein: --, therefor.

In column 31, line 12, in claim 21, delete "requestor;and" and insert -- requestor; and --, therefor.

In column 31, line 32, in claim 24, delete "step" and insert -- steps --, therefor.

In column 32, line 11, in claim 28, delete "source." and insert -- resource. --, therefor.

In column 32, line 13, in claim 29, delete "step" and insert -- steps --, therefor.